(12) United States Patent
van Schooten et al.

(10) Patent No.: US 12,495,776 B2
(45) Date of Patent: Dec. 16, 2025

(54) TRANSGENIC NON-HUMAN ANIMALS PRODUCING MODIFIED HEAVY CHAIN-ONLY ANTIBODIES

(71) Applicant: TeneoBio, Inc., Thousand Oaks, CA (US)

(72) Inventors: Wim van Schooten, Sunnyvale, CA (US); Nathan Trinklein, Redwood City, CA (US); Shelley Force Aldred, Hayward, CA (US); Marianne Bruggemann, Menlo Park, CA (US); Mike Osborn, Menlo Park, CA (US)

(73) Assignee: TeneoBio, Inc., Thousand Oaks, CA (US)

( * ) Notice: Subject to any disclaimer, the term of this patent is extended or adjusted under 35 U.S.C. 154(b) by 624 days.

(21) Appl. No.: 16/327,299

(22) PCT Filed: Aug. 22, 2017

(86) PCT No.: PCT/US2017/047928
§ 371 (c)(1),
(2) Date: Feb. 21, 2019

(87) PCT Pub. No.: WO2018/039180
PCT Pub. Date: Mar. 1, 2018

(65) Prior Publication Data
US 2019/0225671 A1    Jul. 25, 2019

Related U.S. Application Data

(60) Provisional application No. 62/379,075, filed on Aug. 24, 2016.

(51) Int. Cl.
| | | |
|---|---|---|
| *A01K 67/0275* | (2024.01) | |
| *A01K 67/027* | (2024.01) | |
| *C07K 16/00* | (2006.01) | |
| *C12N 15/90* | (2006.01) | |

(52) U.S. Cl.
CPC ........ *A01K 67/0275* (2013.01); *A01K 67/027* (2013.01); *C07K 16/00* (2013.01); *A01K 2217/052* (2013.01); *A01K 2227/105* (2013.01); *A01K 2267/01* (2013.01); *C07K 2317/21* (2013.01); *C07K 2317/24* (2013.01); *C07K 2317/52* (2013.01); *C07K 2317/522* (2013.01); *C07K 2317/565* (2013.01); *C07K 2317/567* (2013.01); *C07K 2317/569* (2013.01); *C12N 15/902* (2013.01)

(58) Field of Classification Search
CPC .............. A01K 67/0275; A01K 67/027; A01K 2217/052; A01K 2227/105; A01K 2267/01; C07K 16/00; C07K 2317/21; C07K 2317/24; C07K 2317/52; C07K 2317/522; C07K 2317/565; C07K 2317/567; C07K 2317/569; C12N 15/902

USPC ............................. 800/18, 13, 6; 530/387.1
See application file for complete search history.

(56) References Cited

U.S. PATENT DOCUMENTS

| | | | |
|---|---|---|---|
| 7,541,513 | B2 | 6/2009 | Bruggeman et al. |
| 8,367,888 | B2 | 2/2013 | Bruggemann et al. |
| 8,410,249 | B2 | 4/2013 | Pier et al. |
| 8,703,485 | B2 | 4/2014 | Buelow |
| 8,883,150 | B2 | 11/2014 | Craig et al. |
| 11,186,639 | B2 | 11/2021 | Harris et al. |
| 11,390,681 | B2 | 7/2022 | Harris et al. |
| 11,421,027 | B2 | 8/2022 | Trinklein et al. |
| 11,427,642 | B2 | 8/2022 | Trinklein et al. |
| 11,434,299 | B2 | 9/2022 | Force Aldred et al. |
| 11,505,606 | B2 | 11/2022 | Trinklein et al. |
| 11,613,572 | B2 | 3/2023 | Trinklein et al. |
| 11,905,326 | B2 | 2/2024 | Trinklein et al. |
| 2009/0098134 | A1 | 4/2009 | Buelow |
| 2010/0122358 | A1 | 5/2010 | Bruggemann et al. |
| 2012/0151610 | A1 | 6/2012 | Craig et al. |
| 2014/0056897 | A1 | 2/2014 | Buelow et al. |
| 2019/0263904 | A1 | 8/2019 | Trinklein et al. |
| 2019/0352412 | A1 | 11/2019 | Force Aldred et al. |
| 2020/0048348 | A1 | 2/2020 | Trinklein et al. |
| 2020/0138865 | A1 | 5/2020 | Kochenderfer et al. |
| 2020/0157232 | A1 | 5/2020 | Trinklein et al. |
| 2020/0339685 | A1 | 10/2020 | Schellenberger et al. |
| 2021/0095022 | A1 | 4/2021 | Force Aldred et al. |
| 2021/0147564 | A1 | 5/2021 | Trinklein et al. |
| 2021/0332133 | A1 | 10/2021 | Force Aldred et al. |

(Continued)

FOREIGN PATENT DOCUMENTS

| | | |
|---|---|---|
| CN | 1518559 A | 8/2004 |
| CN | 102482342 A | 5/2012 |

(Continued)

OTHER PUBLICATIONS

Kabat et al. (1983) Sequences of Proteins of Immunological Interest Bethesda:National Institutes of Health.*
Harding and Lonberg (1995) Annals of the New York Academy of Sciences, vol. 764:536-546.*
Tudor et al. (2009) Mucosal Immunology, vol. 2(5), 412-426.*
Barthelemy et al., "Comprehensive Analysis of the Factors Contributing to the Stability and Solubility of Autonomous Human VH Domains," (2008) Journal of Biological Chemistry 283:3639-3654.
"OMT Therapeutics Announces UniRat™ Alliance with Caltech," May 15, 2015, retrieved from the Internet on Jul. 7, 2020 at URL: https://www.businesswire.com/news/home/20150514006523/en/OMT-Therapeutics-Announces-UniRat%E2%84%A2-Alliance-Caltech.

(Continued)

Primary Examiner — Anne Marie S Wehbe
(74) Attorney, Agent, or Firm — Haynes and Boone LLP

(57) ABSTRACT

Human or chimeric heavy chain-only antibodies are provided, in the native amino acid residue at the first position of the fourth framework region (FR4) of said HCAb is substituted by a different amino acid residue that is capable of disrupting a surface-exposed hydrophobic patch comprising or associated with the native amino acid residue at that position.

14 Claims, 8 Drawing Sheets

Specification includes a Sequence Listing.

(56) References Cited

U.S. PATENT DOCUMENTS

| | | |
|---|---|---|
| 2021/0340255 A1 | 11/2021 | Harris et al. |
| 2021/0355215 A1 | 11/2021 | Jorgensen et al. |
| 2021/0403587 A1 | 12/2021 | Buelow et al. |
| 2022/0025047 A1 | 1/2022 | Trinklein et al. |
| 2022/0089729 A1 | 3/2022 | Harris et al. |
| 2022/0195068 A1 | 6/2022 | Van Schooten et al. |
| 2022/0332820 A1 | 10/2022 | Harris et al. |
| 2023/0045100 A1 | 2/2023 | Force Aldred et al. |
| 2023/0060847 A1 | 3/2023 | Trinklein et al. |
| 2023/0082151 A1 | 3/2023 | Trinklein et al. |
| 2023/0257473 A1 | 8/2023 | Trinklein et al. |
| 2023/0272075 A1 | 8/2023 | Trinklein et al. |

FOREIGN PATENT DOCUMENTS

| | | |
|---|---|---|
| EP | 1438338 A2 | 7/2004 |
| EP | 1693384 A2 | 8/2006 |
| JP | 2005-289809 | 10/2005 |
| JP | 2012-024087 | 2/2012 |
| JP | 2005-520494 | 7/2014 |
| RU | 2425880 C2 | 8/2011 |
| WO | 03/035694 A2 † | 5/2003 |
| WO | 2003/035694 A2 | 5/2003 |
| WO | WO 03/035694 * | 5/2003 |
| WO | 2004062551 A2 | 7/2004 |
| WO | 2006/008548 A2 | 1/2006 |
| WO | 2008/074839 A2 † | 6/2008 |
| WO | 2008151081 A1 | 12/2008 |
| WO | WO 2010/109165 * | 3/2010 |
| WO | 2010/109165 A2 † | 9/2010 |
| WO | 2012122512 A1 | 9/2012 |
| WO | 2012122528 A1 | 9/2012 |
| WO | 2012163805 A1 | 12/2012 |
| WO | 2013154760 A1 | 10/2013 |
| WO | 2014068079 A1 | 5/2014 |
| WO | 2014093908 A2 | 6/2014 |
| WO | 2014/141192 | 9/2014 |
| WO | 2017223111 A1 | 12/2017 |
| WO | 2018/039180 | 3/2018 |
| WO | 2018052503 A1 | 3/2018 |
| WO | 2018119215 A1 | 6/2018 |
| WO | 2018237006 A1 | 12/2018 |
| WO | 2018237037 A2 | 12/2018 |
| WO | 2019006072 A1 | 1/2019 |
| WO | 2019055689 A1 | 3/2019 |
| WO | 2019126756 A1 | 6/2019 |
| WO | 2019133761 A1 | 7/2019 |
| WO | 2020018922 A1 | 1/2020 |
| WO | 2020061478 A2 | 3/2020 |
| WO | 2020087065 A1 | 4/2020 |
| WO | 2020206330 A1 | 10/2020 |
| WO | 2020252366 A1 | 12/2020 |
| WO | 2021127489 A1 | 6/2021 |
| WO | 2021222578 A1 | 11/2021 |
| WO | 2021222616 A1 | 11/2021 |
| WO | 2022006316 A1 | 1/2022 |
| WO | 2022109010 A1 | 5/2022 |
| WO | 2022183074 A2 | 9/2022 |
| WO | 2022183101 A1 | 9/2022 |
| WO | 2022212848 A1 | 10/2022 |
| WO | 2022216864 A1 | 10/2022 |
| WO | 2022221698 A1 | 10/2022 |
| WO | 2022271987 A1 | 12/2022 |
| WO | 2023004197 A1 | 1/2023 |

OTHER PUBLICATIONS

Benny et al., "The Kabat Database and a Bioinformatics Example," In: "Antibody Engineering," (2003) 248:11-26.

Bruggemann et al., "Heavy-chain-only Antibody Expression and B-Cell Development in the Mouse," (2006) Crit Rev Immunol 26(5):377-90.

Cui et al., "Targeted Integration in Rat and Mouse Embryos with Zinc-finger nucleases," (2011) Nat. Biotechnol. 29:64-67.

Desmyter et al., "Antigen specificity and high affinity binding provided by one single loop of a camel single-domain antibody," (2001) Journal of Biological Chemistry, American Society for Biochemistry and Molecular Biology 276(28):26285-26290.

Geurts et al., "Knockout Rats via Embryo Microinjection of Zinc-Finger Nucleases," (2009) Science 325(5939):433.

Iri-Sofla et al., "Nanobody-based chimeric receptor gene integration in Jurkat cells mediated by PhiC31 integrase," (2011) Experimental Cell Research 317(18):2630-2641.

Jackson et al., "Driving CAR T-cells forward," (2016) Nature Reviews Clinical Oncology 13:370-383.

Jamnani et al., "T cells expressing VHH-directed oligoclonal chimeric HER2 antigen receptors: Towards tumor-directed oligoclonal T cell therapy," (2014) Biochim Biophys Acta 1840(1):378-386.

Janssens et al., "Generation of heavy-chain-only antibodies in mice," (2006) Proceedings National Academy of Sciences PNAS 103(41):15130-15135.

Ma et al., "Human Antibody Expression in Transgenic Rats: Comparison of Chimeric IgH Loci with Human $V_H$, D and $J_H$ but Bearing Different Rat C-gene Regions," (2013) J. Immunol. Methods 400-401:78-86.

Ma et al., "Assimilation of NAD Precursors in Candida Glabrata," (2007) Mol Microbiol. 66(1):14-25.

Marchuk et al., "PYAC-RC, a Yeast Artificial Chromosome Vector for Cloning DNA Cut with Infrequently Cutting Restriction Endonucleases," (1988) Nucleic Acids Res. 16(15):7743.

Menoret et al., "Characterization of Immunoglobulin Heavy Chain Knockout Rats,," (2010) Eur. J. Immunol. 40:2932-2941.

Nguyen et al., "Heavy-chain Only Antibodies Derived from Dromedary are Secreted and Displayed by Mouse B Cells," (2003) Immunology 109(1):93-101.

Osborn et al., "High-Affinity IgG Antibodies Develop Naturally in Ig-Knockout Rats Carrying Germline Human IgH/IgK/IgA Loci Bearing the Rat CH Region," (2013) J. Immunol. 190:1481-1490.

Zou et al., "Heavy chain—only antibodies are spontaneously produced in light chain—deficient mice," (2007) J Exp Med 204(13):3271-3283.

Mariuzza et al., "The structural basis of antigen-antibody recognition," (1987) Ann. Rev. Biophys. Biophys. Chem. 16:139-159.

Singer et al., "Genes and Genomes A Changing Perspective," (1991) Moscow, "Mir", 1:63-64.

Roit et al., Immunology, Moscow, "Mir", 2000, pp. 110-111.

Rybchin, "Fundamentals of Genetic Engineering," (2002) Saint-Petersburg, Editorial House of Saint-Petersburg State Technical University, pp. 411-413.

Dennis, "Welfare issues of genetically modified animals," (2002) ILAR Journal 43(2):100-109.

Zhou et al., "Developing tTA transgenic rats for inducible and reversible gene expression," (2009) International Journal of Biological Sciences 5:171-181.

Houbedine, "Methods to Generate Transgenic Animals, Genetic Engineering in Livestock," (2009) New Applications and Interdisciplinary Perspectives XVI, I (46):31-47.

Cao et al., "Isolation and Culture of Primary Bovine Embryonic Stem Cell Colonies by a Novel Method," (2009) Journal of Experimental Zoology 311A:368-376.

Brevini et al., "No shortcuts to pig embryonic stem cells, Embryonic Stem Cells in Domestic Animals," (2010) Theriogenology 74:544-550.

Paris et al., "Equine embryos and embryonic stem cells: Defining reliable markers of pluripotency, Embryonic Stem Cells in Domestic Animals," (2010) Theriogenology 74:516-524.

Glick et al., Molecular biotechnology. Principles and applications, Moscow, MIR (2002) pp. 45-47.

Voncken et al., "Transgenic mouse methods and protocols," (2002-2003) Methods in molecular biology 209:51-58.

Omniab, "Naturally Optimized Human Antibodies," (Feb. 23, 2016) retrieved from Internet: URL:http://content.stockpr.com/omniab/db/252/746/file/OmniAb.pdf.

Kim et al., "Mutational approaches to improve the biophysical properties of human single-domain antibodies," (2014) Biochimica Et Biophysica ACTA (BBA)—Proteins & Proteomics, Elseviern Netherlands 1844(11):1983-2001.

(56) References Cited

OTHER PUBLICATIONS

Clarke et al., "Multispecific Antibody Development Platform Based on Human Heavy Chain Antibodies," (2019) Frontiers in Immunology 9(3037):1-13.

*Harbour Antibodies et al.*, v. *TeneoBio, Inc.*, US Complaint and Demand for Jury Trial and Injunctive Relief, filed Dec. 23, 2021 (Case 1:21-cv-01807-MN).

Third Party Observations in Relation to EP Patent Application No. 17761656.2 for TeneoBio, Inc., dated Sep. 21, 2022.

Bogard, et al., "Isolation and Characterization of Murine Monoclonal Antibodies, Specific for Gram-Negative Bacterial Lipopolysaccharide: Associate of Cross-Genus Reactivity with Lipid A Specificity," Infection and Immunity, 1987, vol. 55, No. 4, pp. 899-908.

Brüggemann M., et al., "A Matched Set of Rat/Mouse Chimeric Antibodies. Identification and Biological Properties of Rat H Chain Constant Regions mu, gamma 1, gamma 2a, gamma 2b, gamma 2c, epsilon, and alpha," The Journal of Immunology, May 1, 1989; 142 (9): 3145-3150, Retrieved from the Internet URL: https://doi.org/10.4049/jimmunol.142.9.3145.

Dai H., et al., "Chimeric Antigen Receptors Modified T-Cells for Cancer Therapy," JNCI: Journal of the National Cancer Institute, First Published Online on Jan. 27, 2016, vol. 108, No. 7: dJv439, pp. 1-14.

Gao X., et al., "Thermodynamically balanced inside-out (TBIO) PCR-based gene synthesis: a novel method of primer design for high-fidelity assembly of longer gene sequences," Nucleic acids research, 2003, vol. 31, No. 22, pp. e143.

Jaton J-C., et al., "Recovery of Antibody Activity Upon Reoxidation of Completely Reduced Polyalany! Heavy Chain and its Fd Fragment Derived from Anti-2,4-dinitrophenyl Antibody," Biochemistry, Dec. 1968, vol. 7, No. 12, pp. 4185-4195.

Kay M.A., et al., "A Robust System for Production of Minicircle DNA Vectors," Nature Biotechnology, 2010, vol. 28, pp. 1287-1289, Retrieved from the Internet URL: https://doi.org/10.1038/nbt.1708.

Kohler G., et al., "Pillars Article: Continuous Cultures of Fused Cells Secreting Antibody of Predefined Specificity," Nature, Aug. 7, 1975, vol. 256, No. 5517, pp. 495-497.

Muyldermans S., "Single Domain Camel Antibodies: Current Status," Journal of Biotechnology, 2001, vol. 74, No. 4, pp. 277-302.

Ouisse L.H., et al., Antigen-Specific Single B Cell Sorting and Expression-Cloning from Immunoglobulin Humanized Rats: a Rapid and Versatile Method for the Generation of High Affinity and Discriminative Human Monoclonal Antibodies, BMC Biotechnology, 2017, vol. 17, No. 3, pp. 1-17.

Reddy S.T., et al., "Monoclonal Antibodies Isolated Without Screening by Analyzing the Variable-Gene Repertoire of Plasma Cells," Nature Biotechnology, 2010, vol. 28, pp. 965-969.

Revets H., et al., "Nanobodies as Novel Agents for Cancer Therapy," Expert Opinion on Biological Therapy, 2005, vol. 5, No. 1, pp. 111-124.

Sitia R., et al., "Developmental Regulation of IgM Secretion: The Role of the Carboxy-Terminal Cysteine," Cell, Mar. 9, 1990, vol. 60, pp. 781-790.

Wang G., et al., "Increased Vancomycin MICs for Staphylococcus aureus Clinical Isolates from a University Hospital during a 5-Year Period," Journal of Clinical Microbiology, 2006, vol. 44, No. 11, pp. 3883.

Berman J.E., et al., "Content and Organization of the Human Ig VH locus: Definition of Three New VH Families and Linkage to the Ig CH locus," EMBO Journal, Mar. 1988, vol. 7, No. 3, pp. 727-738.

Tarantul V.Z., "Dictionary of Biotechnological Terms," Rospatent Information and Publishing Center, 2005, 5 pages.

Kabat, E. A. et al 1983 Sequences of Proteins of Immunological Interest Bethesda:National Institutes of Health.†

\* cited by examiner
† cited by third party

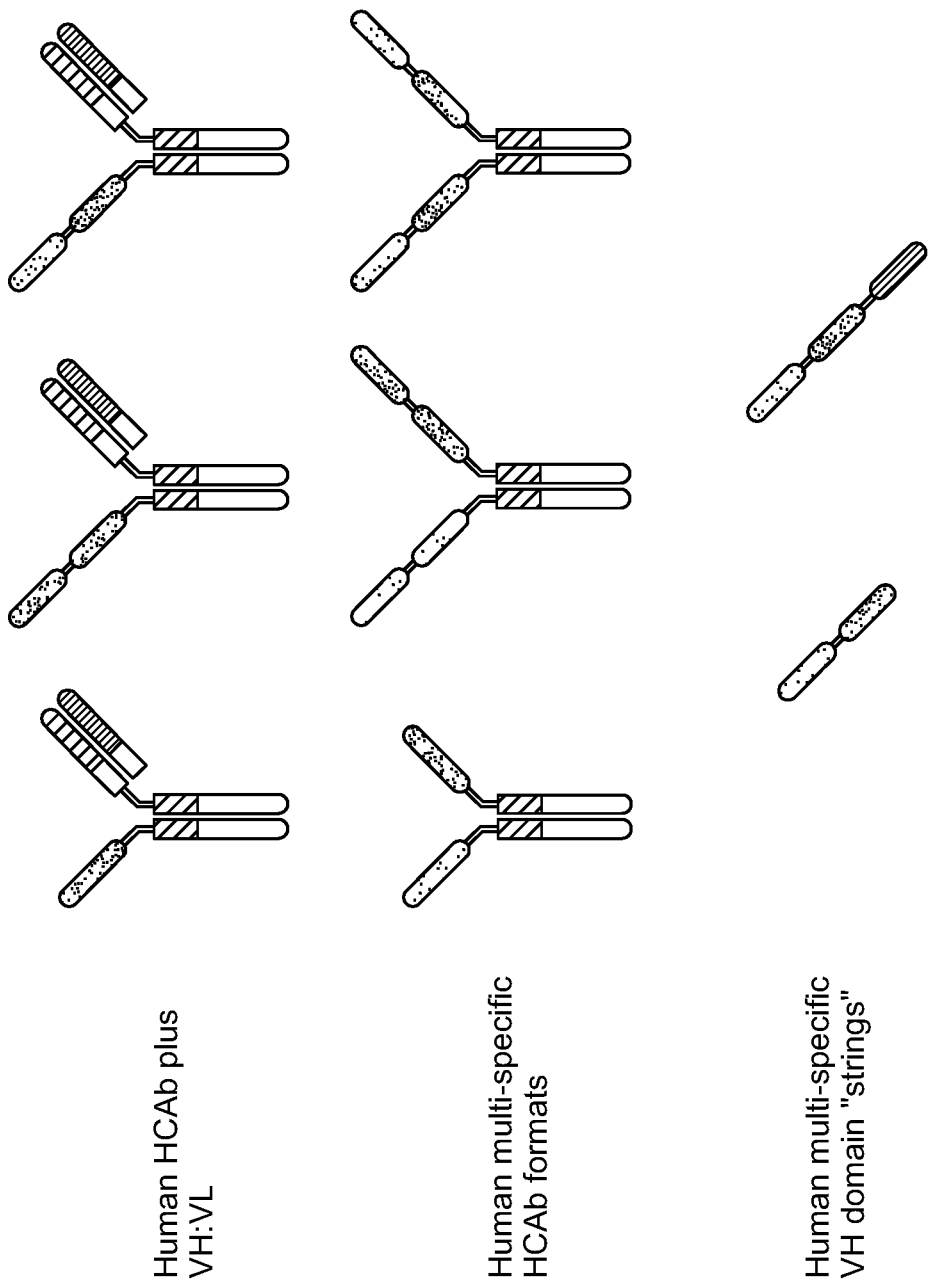

ID ANIMALS
PRODUCING MODIFIED HEAVY
CHAIN-ONLY ANTIBODIES

SEQUENCE LISTING

The instant application contains a Sequence Listing which has been submitted electronically in ASCII format and is hereby incorporated by reference in its entirety. Said ASCII copy, created on Aug. 11, 2017, is named TNO-0001-WO_SL.txt and is 26,401 bytes in size.

FIELD OF THE INVENTION

The present invention concerns transgenic non-human animals producing modified heavy chain-only antibodies (HCAbs). In particular, the invention concerns transgenic non-human animals, such as transgenic rats or mice, producing modified human or chimeric HCAbs with reduced propensity to aggregate, antibodies so prepared and methods of making and using the same.

BACKGROUND OF THE INVENTION

Heavy Chain-Only Antibodies

The basic four-chain antibody unit is a heterotetrameric glycoprotein composed of two identical light (L) chains and two identical heavy (H) chains. In the case of IgGs, the 4-chain unit is generally about 150,000 daltons. Each L chain is linked to a H chain by one covalent disulfide bond, while the two H chains are linked to each other by one or more disulfide bonds depending on the H chain isotype. Each H and L chain also has regularly spaced intrachain disulfide bridges. Each H chain has at the N-terminus, a variable domain ($V_H$) followed by three constant domains ($C_H$) for each of the α and γ chains and four $C_H$ domains for μ and ε isotypes. Each L chain has at the N-terminus, a variable domain ($V_L$) followed by a constant domain ($C_L$) at its other end. The $V_L$ is aligned with the $V_H$ and the $C_L$ is aligned with the first constant domain of the heavy chain ($C_H1$). Particular amino acid residues are believed to form an interface between the light chain and heavy chain variable domains. The pairing of a $V_H$ and $V_L$ together forms a single antigen-binding site. An IgM antibody consists of 5 of the basic heterotetramer unit along with an additional polypeptide called J chain, and therefore contain 10 antigen binding sites, while secreted IgA antibodies can polymerize to form polyvalent assemblages comprising 2-5 of the basic 4-chain units along with J chain. For the structure and properties of the different classes of antibodies, see, e.g., *Basic and Clinical Immunology*, 8th edition, Daniel P. Stites, Abba I. Terr and Tristram G. Parslow (eds.), Appleton & Lange, Norwalk, Conn., 1994, page 71 and Chapter 6. In such antibodies, interaction of the $V_H$ and $V_L$ domains forms an antigen binding region, although binding is facilitated by the $C_{H1}$ domain and parts of the $C_L$ domain.

The L chain from any vertebrate species can be assigned to one of two distinct types, called kappa (κ) and lambda (λ), based on the amino acid sequences of their constant domains. Depending on the amino acid sequence of the constant domain of their heavy chains ($C_H$), immunoglobulins can be assigned to different classes or isotypes. There are five classes of immunoglobulins: IgA, IgD, IgE, IgG, and IgM, having heavy chains designated α, δ, ε, γ, and μ, respectively. The γ and α classes are further divided into subclasses on the basis of relatively minor differences in $C_H$ sequence and function, e.g., humans express the following subclasses: IgG1, IgG2, IgG3, IgG4, IgA1, and IgA2.

In a conventional IgG antibody, the association of the heavy chain and light chain is due in part to a hydrophobic interaction between the light chain constant region and the CH1 constant domain of the heavy chain. There are additional residues in the heavy chain framework 2 (FR2) and framework 4 (FR4) regions that also contribute to this hydrophobic interaction between the heavy and light chains.

It is known, however, that sera of camelids (sub-order Tylopoda which includes camels, dromedaries and llamas) contain a major type of antibodies composed solely of paired H-chains (heavy-chain only antibodies or HCAbs). The HCAbs of Camelidae (*Camelus dromedaries, Camelus bactrianus, Lama glama, Lama guanaco, Lama alpaca* and *Lama vicugna*) have a unique structure consisting of a single variable domain (VHH), a hinge region and two constant domains (CH2 and CH3), which are highly homologous to the CH2 and CH3 domains of classical antibodies. These HCAbs lack the first domain of the constant region (CH1) which is present in the genome, but is spliced out during mRNA processing. The absence of the CH1 domain explains the absence of the light chain in the HCAbs, since this domain is the anchoring place for the constant domain of the light chain. Such HCAbs naturally evolved to confer antigen-binding specificity and high affinity by three CDRs from conventional antibodies or fragments thereof (Muyldermans, 2001; *J Biotechnol* 74:277-302; Revets et al., 2005; *Expert Opin Biol Ther* 5:111-124).

Cartilaginous fish have also evolved a distinctive type of immunoglobulin, designated as IgNAR, which lacks the light polypeptide chains and is composed entirely by heavy chains.

The ability of heavy chain-only antibodies devoid of light chain to bind antigen was established in the 1960s (Jaton et al. (1968) *Biochemistry*, 7, 4185-4195). Heavy chain immunoglobulin physically separated from light chain retained 80% of antigen-binding activity relative to the tetrameric antibody.

Sitia et al. (1990) *Cell*, 60, 781-790 demonstrated that removal of the CH1 domain from a rearranged mouse μ gene results in the production of a heavy chain-only antibody, devoid of light chain, in mammalian cell culture. The antibodies produced retained VH binding specificity and effector functions.

The discovery of camelid heavy chain antibodies stimulated interest in developing human single domain antibodies in artificial systems such as phage display. Early human domain antibodies identified this way were prone to aggregation and had solubility problems likely due to the exposed hydrophobic patches in the framework regions that are normally buried in the interface with the light chain constant region. Subsequent studies that elucidated the crystal structure of human VH domain antibodies identified surface exposed residues of human domain antibodies. Barthelemy et al. (2008) *J. Biol. Chem.*, 283, 3639-3654 report a comprehensive analysis of the factors contributing to the stability and solubility of autonomous human VH domains.

The cloned and isolated VHH domain is a stable polypeptide having the full antigen-binding capacity of the original HCAb. Nanobodies are the smallest available intact antigen binding fragments (about 12-15 kDa) possessing the full antigen-binding capacity of the original heavy chain of the heavy-chain antibodies that have evolved, which are fully functional in the absence of light chains. These VHH domains form the basis of a new generation of therapeutic antibodies, named nobodies, which are suitable for intravenous oral or topical administration, can be readily manufactured in mono- or multi-valent forms exhibiting high potency and binding affinity to one or more targets.

Single domain VHH antibodies, including methods for their preparation, are described, for example, in WO2004062551.

Mice in which the λ (lambda) light (L) chain locus and/or the λ and κ (kappa) L chain loci have been functionally silenced and antibodies produced by such mice are described in U.S. Pat. Nos. 7,541,513 and 8,367,888. Recombinant production of heavy-chain-only antibodies in mice and rats has been reported, for example, in WO2006008548; U.S. Application Publication No. 20100122358; Nguyen et al., 2003, *Immunology;* 109(1), 93-101; Brüggemann et al., *Crit. Rev. Immunol.;* 2006, 26(5):377-90; and Zou et al., 2007, *J Exp Med;* 204(13): 3271-3283. The production of knockout rats via embryo microinjections of zinc-finger nucleases is described in Geurts et al., 2009, *Science*, 325(5939):433. The characterization of immunoglobulin heavy chain knockout rats is reported by Ménoret et al., 2010, *European Journal of Immunology*, 40:2932-2941. Soluble heavy chain-only antibodies and transgenic rodents comprising a heterologous heavy chain locus producing such antibodies are described in U.S. Pat. No. 8,883,150. CAR-T structures comprising single-domain antibodies as binding (targeting) domain are described, for example, in Iri-Sofla et al., 2011, *Experimental Cell Research* 317:2630-2641 and Jamnani et al., 2014, *Biochim Biophys Acta*, 1840:378-386.

Despite recent advances, there is a need for improved methods for the production of heavy chain-only antibodies, which have less propensity for aggregation and retain high affinity for their intended target.

SUMMARY OF THE INVENTION

The present invention is based, at least in part, on the finding that heavy chain-only antibodies (HCAbs) with less propensity for aggregation can be prepared by replacement of the native amino acid residue at the first position of the fourth framework region (FR4) of a HCAb by another amino acid residue that is capable of disrupting a surface-exposed hydrophobic patch comprising or associated with the native amino acid residue at that position. Such hydrophobic patches are normally buried in the interface with the antibody light chain constant region but become surface exposed in HCAbs and are, at least partially, for the unwanted aggregation and light chain association of HCAbs.

In one aspect, the invention concerns an isolated human or chimeric heavy chain-only antibody (HCAb) comprising a heavy chain variable (VH) domain, comprising complementarity determining regions (CDRs) and framework regions (FRs), having binding affinity to a target antigen in the absence of an antibody light chain, wherein in said VH domain the native amino acid residue at the first position of the fourth framework region (FR4) of said HCAb is substituted by a different amino acid residue that is capable of disrupting a surface-exposed hydrophobic patch comprising or associated with the native amino acid residue at that position.

In one embodiment, the HCAb is a human antibody.

In another embodiment, in the HCAb the native amino acid residue at the first position of FR4 is substituted by a polar amino acid residue.

In yet another embodiment, in the HCAb the native amino acid residue at the first position of FR4 is substituted by a positively charged amino acid residue, such as, for example, lysine (K), arginine (R) or histidine (H), preferably arginine (R).

In a particular embodiment, the HCAb comprises a tryptophan (W) to arginine (R) substitution at the first amino acid residue in the fourth framework (FR4) region.

In all embodiments, the HCAbs may comprise one or more further mutations in one or more framework regions.

In all embodiments, the HCAbs may have reduced propensity for aggregation relative to a corresponding antibody comprising the native amino acid residue at the first amino acid residue in FR4.

In all embodiments, the HCAbs may have a binding affinity of about 1 pM to about 1 µM to its target antigen.

In another aspect, the invention concerns an isolated human or chimeric heavy chain-only antibody (HCAb) having binding affinity to a target antigen in the absence of an antibody light chain, comprising a heavy chain variable (VH) domain comprising complementarity determining regions (CDRs) and framework regions (FRs), wherein said HCAb comprises a tryptophane (T) to arginine (R) substitution at the first amino acid position in the fourth FR region (FR4) of the native human VH amino acid sequence.

In one embodiment, the HCAb further comprises a heavy chain constant (CH) domain, lacking a CH1 region, and can be an IgG antibody, such as an IgG1 antibody.

In another embodiment, the HCAb comprises one or more further mutations in one or more FR regions.

In yet another embodiment, the HCAb has reduced propensity for aggregation relative to a corresponding antibody comprising the native amino acid residue at the first amino acid residue in FR4.

In another aspect, the invention concerns a chimeric antigen receptor (CAR) comprising a heavy chain-only antibody as herein described. In one embodiment, the CAR comprises a single human VH domain.

In a further aspect, the invention concerns an isolated autonomous human antibody heavy chain variable (VH) domain comprising complementary determining regions (CDRs) and framework regions (FR), having binding affinity to a target antigen comprising a substitution of a different amino acid residue, that is capable of disrupting a surface-exposed hydrophobic patch comprising or associated with the native amino acid residue at that position, for the native amino acid residue at the first amino acid residue in the fourth framework (FR4) region.

In one embodiment, in the isolated autonomous human VH domain the native amino acid residue at the first position of FR4 is substituted by a polar amino acid residue.

In another embodiment, the native amino acid residue at the first position of FR4 is substituted by a positively charged amino acid residue, such as a lysine (K), arginine (R) or histidine (H), residue, preferably an arginine (R) residue.

In a further embodiment, the isolated autonomous human VH domain comprises a tryptophan (W) to arginine (R) substitution at the first amino acid residue in the fourth framework (FR4) region.

In a still further embodiment, the isolated autonomous human VH domain comprises one or more further mutations in one or more framework regions.

In a further aspect, the invention concerns a multi-valent binding protein containing multiple antigen binding domains that include at least one human VH domain comprising complementarity determining regions (CDRs) and framework regions (FRs), having binding affinity to a target antigen, wherein in said VH domain the native amino acid residue at the first position of the fourth framework region (FR4) of said multi-valent binding protein is substituted by a different amino acid residue that is capable of disrupting a surface-exposed hydrophobic patch comprising or associated with the native amino acid residue at that position.

In one embodiment, in the multi-valent binding protein the native amino acid residue at the first position of FR4 is substituted by a polar amino acid residue.

In another embodiment, in the multi-valent binding protein the native amino acid residue at the first position of FR4 is substituted by a positively charged amino acid residue, such as a lysine (K), arginine (R) or histidine (H) residue, preferably an arginine (R) residue.

In a further embodiment, thr multi-valent binding protein comprises a tryptophan (W) to arginine (R) substitution at the first amino acid residue in the fourth framework (FR4) region.

In all embodiments, the multi-valent binding protein may comprise one or more further mutations in one or more framework regions.

In a further embodiment, the invention concerns a recombinant heavy chain-only immunoglobulin (Ig) locus comprising one or more human V gene segments, one or more human D gene segments, and one or more human J gene segments, which when recombined with each other in the genome of a non-human animal, and following affinity maturation, encode a heavy chain variable (VH) region comprising complementarity determining regions (CDRs) and framework (FR) regions, wherein at least one of said human J segments comprises a codon encoding a non-native amino acid residue at the first position of the fourth framework region (FR4) that is capable of disrupting a surface-exposed hydrophobic patch comprising or associated with the native amino acid residue at that position.

In one embodiment, the recombinant heavy chain-only Ig locus further comprises a constant (C) region gene segment, encoding an immunoglobulin constant effector region lacking CH1 functionality.

In various embodiments, the recombinant heavy chain-only Ig locus comprises two to 40 D gene segments, and/or two to 20 J gene segments.

In another embodiment, more than one of the human J segments comprise a codon encoding a non-native amino acid residue at the first position of the fourth framework region (FR4) that is capable of disrupting a surface-exposed hydrophobic patch comprising or associated with the native amino acid residue at that position.

In yet another embodiment, in the recombinant heavy chain-only Ig locus of all of the human J segments comprise a codon encoding a non-native amino acid residue at the first position of the fourth framework region (FR4) that is capable of disrupting a surface-exposed hydrophobic patch comprising or associated with the native amino acid residue at that position.

In a further embodiment, in the encoded heavy VH region the native amino acid residue at the first position of FR4 is substituted by a polar amino acid residue, such as a lysine (K), arginine (R) or histidine (H), preferably an arginine (R) residue.

In a still further embodiment, the encoded VH region comprises a tryptophan (W) to arginine (R) substitution at the first amino acid residue in the fourth framework (FR4) region.

In yet another embodiment, the recombinant heavy chain-only Ig locus comprises a J4 gene segment in which the codon for W is replaced by R.

In all embodiments, the recombinant heavy chain-only Ig locus encodes a VH region which comprises one or more further mutations in one or more framework regions.

In a further embodiment, the recombinant heavy chain-only Ig locus encodes a human or humanized heavy chain-only antibody comprising a VH region as hereinabove described.

In another aspect, the invention concerns a transgenic non-human animal comprising a recombinant heavy chain-only Ig locus as hereinabove described.

In various embodiment, the transgenic non-human animal is a non-human mammal, as non-human vertebrate, a rodent, a mouse, or a rat, such as a UniRat™.

In a further aspect, the invention concerns a transgenic non-human animal that does not express any functional immunoglobulin light chain genes and comprises a heterologous heavy chain-only Ig locus comprising one or more V gene segments, one or more D gene segments, and one or more J gene segments, which when recombined with each other and following affinity maturation encode a VH domain comprising complementarity determining regions (CDRs) and framework regions (FRs), in which the native amino acid residue at the first position of the fourth framework region (FR4) of said VH domain is substituted by a different amino acid residue that is capable of disrupting a surface-exposed hydrophobic patch comprising or associated with the native amino acid residue at that position, and one or more constant effector region gene segments, each of which encodes an antibody constant effector region including CH1 functionality, wherein the gene segments are arranged such that a V, a D and a J gene segment and a constant region gene segment recombine to produce a rearranged affinity matured heavy chain-only gene locus encoding a heavy chain-only antibody (HCAb).

In one embodiment, in the VH domain of said transgenic non-human animal the native amino acid residue at the first position of FR4 is substituted by a polar amino acid residue, or a positively charged amino acid residues, such as lysine (K), arginine (R) or histidine (H) residue, preferably an arginine (R) residue.

In another embodiment, in the transgenic non-human animal the VH domain comprises a tryptophan (W) to arginine (R) substitution at the first amino acid residue in the fourth framework (FR4) region.

In yet another embodiment, in the transgenic non-human animal the heterologous heavy chain-only locus comprises a J4 segment in which a codon for W is replaced by a codon for R.

In all embodiments, the encoded heavy chain-only antibody comprises one or more further mutations in one or more framework regions.

In a further embodiment, the transgenic non-human animal is a mammal, a vertebrate, a rodent, a mouse or a rat, such as a UniRat™.

In all aspects, in certain embodiments, the heavy chain-only antibodies herein do not contain mutations in other framework regions, including the FR1, FR2, and FR3 regions.

In all aspect, in certain embodiments, the heavy chain-only antibodies herein do not contain additional framework mutations typically present in camelides, such as camel, llama, dromedary, alpaca or guanaco.

In all aspects, in certain embodiments, the heavy chain-only antibodies herein may comprise one or more further mutations in one or more framework regions, including the FR1, FR2, FR3 and/or FR4 regions, such as, for example, in the FR2 region or in the FR2 and FR4 regions.

In all aspects and embodiments, the target antigens to which the HCAbs of the present invention has binding affinity include, without limitation, cell surface receptors and tumor antigens, such as, for example, EGFR, ErbB2 (HER2), ErbB3 (HER3), ErbB4 (HER4), CTLA-4/CD152, RANKL, TNF-α, CD20, IL-12/IL-23, IL1β, IL-17A, IL-17F, CD38, NGF, IGF-1, IL-12, CD20, CD30, CD39, CD73, CD40, PD-1, PDL-1, PD-L2, BCMA, BTLA, thymic stromal lymphopoietin (TSP), Follicle Stimulating Hormone Receptor (FSHR), Prostate Specific Membrane Antigen (PSMA), Prostate Stem Cell Antigen (PSCA), CD137, OX-40, and IL-33.

In all aspects and embodiments, HCAb binding domains may be part of a multi-specific binding protein that bind to multiple different epitopes of the same target antigen or multiple different epitopes on more than one target antigen. Multi-specific, such as bispecific HCAbs are specifically included, including, for example, bispecific HCAb structures having the following binding affinities: epithelial cell adhesion molecule (EpCam)×CD3; CD19×CD3; EpCam×CD3; TNF-α×IL-17; IL-1α×IL-1β; CD30×CD16A; human epidermal growth factor receptor 2 (HER2)×HER3; IL-4×IL-13; angiopoietin 2 (Ang-2)×vascular endothelial growth factor a (VEGF-A); Factor IXa×Factor X; epidermal growth factor receptor (EGFR)×HER3; IL-17A×IL-17F; HER2×HER3; carcinoembryonic antigen×CD3; CD20×CD3; CD123×CD3; BCMA×CD3, PSMA×PSCA×CD3, PSMA×CD3, PSCA×CD3, CD19×CD22×CD3, CD22×CD3, CD38×PD1, CD38×PD-L1, CD38×CD73, CD38×CD39, PD1×CD39×CD73, and PD1×CD73.

BRIEF DESCRIPTION OF THE DRAWINGS

FIG. 7 shows various multi-specific HCAb constructs comprising human VH binding domains.

DETAILED DESCRIPTION OF THE PREFERRED EMBODIMENTS

Figure 1:
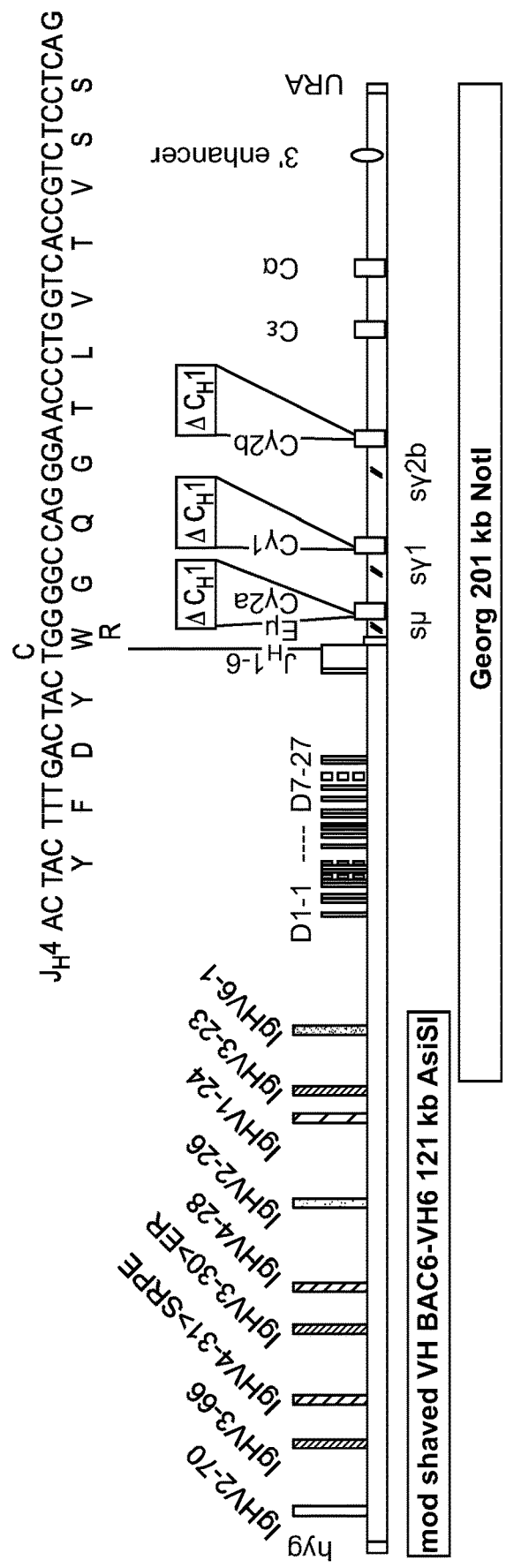
FIG. 1 is a diagram of the human transgene with a J4 gene segment (SEQ ID NO: 40) expressing a R at position 101 in UniRat™ (SEQ ID NO: 41) that express heavy chain-only antibodies, as described in the examples.

The practice of the present invention will employ, unless otherwise indicated, conventional techniques of molecular biology (including recombinant techniques), microbiology, cell biology, biochemistry, and immunology, which are within the skill of the art. Such techniques are explained fully in the literature, such as, "Molecular Cloning: A Laboratory Manual", second edition (Sambrook et al., 1989); "Oligonucleotide Synthesis" (M. J. Gait, ed., 1984); "Animal Cell Culture" (R. I. Freshney, ed., 1987); "Methods in Enzymology" (Academic Press, Inc.); "Current Protocols in Molecular Biology" (F. M. Ausubel et al., eds., 1987, and periodic updates); "PCR: The Polymerase Chain Reaction", (Mullis et al., ed., 1994); "A Practical Guide to Molecular Cloning" (Perbal Bernard V., 1988); "Phage Display: A Laboratory Manual" (Barbas et al., 2001).

All references cited herein, including patent applications and publications, are incorporated by reference in their entirety.

I. Definitions

As used herein, a "transgenic non-human animal" as defined herein is a non-human animal capable of producing a human or humanized heavy chain-only antibody in which the amino acid residue at the first position of the fourth framework region (FR4) is replaced by another residue that is capable of disrupting a surface-exposed hydrophobic patch comprising or associated with such residue. In one embodiment, the native amino acid residue is replaced by a charged amino acid residue, such as a positively charged amino acid residue. The transgenic non-human animal preferably is a mammal, including, without limitation, rats, mice, bovines, monkeys, pigs, sheep, goat, rabbits, dogs, cats, guinea pigs, hamsters and the like. Preferably, the transgenic non-human animal is a rodent, preferably a rat or a mouse, most preferably a UniRat™. The choice of transgenic animal is only limited by the ability to produce a human or chimeric heavy chain-only human or chimeric antibody with the FR4 mutation described herein.

As used herein, a "genetic modification" is one or more alterations in the non-human animal's gene sequences. A non-limiting example is insertion of a transgene into the genome of the transgenic animal.

As used herein, the term "transgene" refers to exogenous DNA containing a promoter, reporter gene, poly adenylation signal and other elements to enhance expression (insulators, introns). This exogenous DNA integrates into the genome of a one-cell embryo from which a transgenic animal develops and the transgene remains in the genome of the mature animal. The integrated transgene DNA can occur at single or multiple places in the genome of the egg or mouse and also single to multiple (several hundred) tandem copies of the transgene can integrate at each genomic location.

"Conventional antibodies" are usually heterotetrameric glycoproteins of about 150,000 daltons, composed of two identical light (L) chains and two identical heavy (H) chains. Each light chain is linked to a heavy chain by one covalent disulfide bond, while the number of disulfide linkages varies among the heavy chains of different immunoglobulin isotypes. Each heavy and light chain also has regularly spaced intrachain disulfide bridges. Each heavy chain has at one end a variable domain ($V_H$) followed by a number of constant domains. Each light chain has a variable domain at one end ($V_L$) and a constant domain at its other end; the constant domain of the light chain is aligned with the first constant domain of the heavy chain, and the light-chain variable domain is aligned with the variable domain of the heavy chain. Particular amino acid residues are believed to form an interface between the light- and heavy-chain variable domains.

Antibody residues herein are numbered according to the Kabat numbering system (e.g., Kabat et al., Sequences of Immunological Interest. 5th Ed. Public Health Service, National Institutes of Health, Bethesda, Md. (1991)). According to this numbering, the first amino acid residue of the FR4 region is at amino acid position 101.

The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called complementarity-determining regions (CDRs) or hypervariable regions both in the light-chain and the heavy-chain variable domains. The more highly conserved portions of variable domains are called the framework (FR). The variable domains of native heavy and light chains each comprise four FR regions, largely adopting a β-sheet configuration, connected by three CDRs, which form loops connecting, and in some cases forming part of, the β-sheet structure. The CDRs in each chain are held together in close proximity by the FR regions and, with the CDRs from the other chain, contribute to the formation of the antigen-binding site of antibodies (see Kabat et al., NIH Publ. No. 91-3242, Vol. 1, pages 647-669 (1991)). The constant domains are not involved directly in binding an antibody to an antigen, but exhibit various effector functions, such as participation of the antibody in antibody-dependent cellular toxicity.

The term "monoclonal antibody" as used herein refers to an antibody obtained from a population of substantially homogeneous antibodies, i.e., the individual antibodies comprising the population are identical except for possible naturally occurring mutations that may be present in minor amounts. Monoclonal antibodies are highly specific, being directed against a single antigenic site. Furthermore, in contrast to conventional (polyclonal) antibody preparations which typically include different antibodies directed against different determinants (epitopes), each monoclonal antibody is directed against a single determinant on the antigen.

The terms "heavy chain-only antibody," "heavy chain antibody" and "HCAb" are used interchangeably, and refer, in the broadest sense, to antibodies lacking the light chain of a conventional antibody. Since the homodimeric HCAbs lack a light chain and thus a VL domain, the antigen is recognized by one single domain, i.e., the variable domain of the heavy chain of a heavy chain antibody (VH or VHH when referring to the heavy chain variable domain of camelids). The term specifically includes, without limitation, homodimeric antibodies comprising the VHH antigen-binding domain and the CH2 and CH3 constant domains or a camelid antibody, in the absence of the CH1 domain; functional (antigen-binding) variants of such antibodies, soluble VH variants, Ig-NAR comprising a homodimer of one variable domain (V-NAR) and five C-like constant domains (C-NAR) and functional fragments thereof; and soluble single domain antibodies (sdAbs) or nobodies. The heavy chain-only antibodies of the present invention comprise at least one heavy chain variable (VH) domain in which the amino acid residue at the first position of FR4 (amino acid residue 101 according to Kabat numbering) is replaced by another residue that is capable of disrupting a surface-exposed hydrophobic patch comprising or associated with such residue. In one embodiment, the native amino acid residue is replaced by a charged amino acid residue, such as a positively charged amino acid residue. The heavy chain-only antibodies of the present invention preferably are human or chimeric antibodies, preferably comprising a Trp (W) to Arg (R) mutation at amino acid position 101 (W101R mutation). In one embodiment, the heavy chain-only antibodies herein are used as a binding (targeting) domain of a chimeric antigen receptor (CAR).

The term "soluble single domain antibody (sdAb)" is used to refer, in the broadest sense, to polypeptides comprising the heavy chain variable domain of a heavy-chain antibody or of a conventional IgG, in the absence of constant domains. The basic sdAb structure is usually comprised of four framework regions (FR1-FR4) interrupted by three complementary determining regions (CDR1-CDR3). Thus, a sdAb may be represented by the following structure: FR1-CDR1-FR2-CDR2-FR3-CDR3-FR4. For further review, see, e.g. Holt et al, "Domain antibodies:proteins for therapy" Trends in Biotechnology (2003): Vol. 21, No. 11:484-490.

Antibodies of the invention include multi-specific antibodies. Multi-specific antibodies have more than one binding specificity. The term "multi-specific" specifically includes "bispecific" and "trispecific," as well as higher-order independent specific binding affinities, such as higher-order polyepitopic specificity, as well as tetravalent antibodies and antibody fragments. The terms "multi-specific antibody," multi-specific single chain-only antibody" and "multi-specific HCAb" are used herein in the broadest sense and cover all antibodies with more than one binding specificity.

The term "valent" as used herein refers to a specified number of binding sites in an antibody molecule.

A "multi-valent" antibody has two or more binding sites. Thus, the terms "bivalent", "trivalent", and "tetravalent" refers to the presence of two binding sites, three binding sites, and four binding sites, respectively. A bispecific antibody according to the invention is at least bivalent and may be trivalent, tetravalent, or otherwise multi-valent. Multi-specific single chain-only antibodies of the present invention, e.g., bispecific antibodies, include multi-valent single chain-only antibodies.

Figure 6:
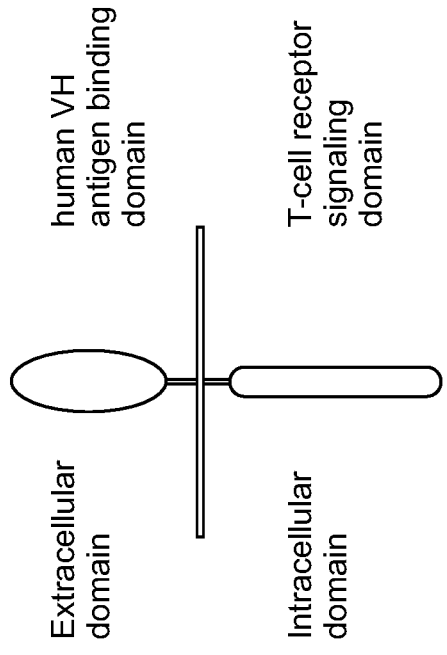
FIG. 6 illustrates two structures of a chimeric antigen receptor using a human VH extracellular binding domain, comparing an scFv CAR-T structure (panel A) and a CAR-T structure (panel B) using a human heavy chain-only antibody of the present invention.
Figure 6:
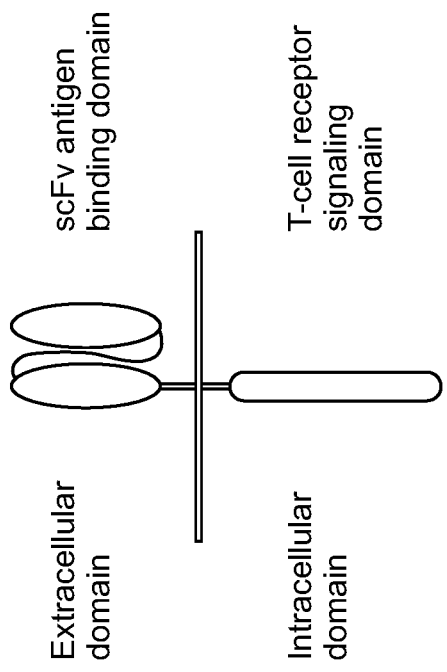

The term "chimeric antigen receptor" or "CAR" is used herein in the broadest sense to refer to an engineered receptor, which grafts a desired binding specificity (e.g. the antigen-binding region of a monoclonal antibody or other ligand) to membrane-spanning and intracellular-signaling domains. Typically, the receptor is used to graft the specificity of a monoclonal antibody onto a T cell to create *J Natl Cancer Inst*, 2015; 108(7):dvj439; and Jackson et al., *Nature Reviews Clinical Oncology*, 2016; 13:370-383. A representative CAR-T construct comprising a human VH extracellular binding domain is shown in FIG. 6.

By "recombinant immunoglobulin (Ig) locus" is meant an Ig locus that lacks a portion of the endogenous Ig locus and/or comprises at least one fragment that is not endogenous to the Ig locus in the subject mammal. Such a fragment may be human or non-human, and may include any Ig gene segment or portion thereof, or may constitute the entire Ig locus. A recombinant Ig locus is preferably a functional locus capable of undergoing gene rearrangement and producing a repertoire of immunoglobulins in the transgenic animal. Recombinant Ig loci include recombinant Ig light chain loci and recombinant Ig heavy chain loci. Once incorporated into the genome of a host, an artificial Ig locus may be referred to as a recombinant Ig locus.

By "transgenic antibody" is meant an antibody encoded by a recombinant Ig locus and produced by or otherwise derived from a transgenic non-human mammal comprising the recombinant Ig locus in accordance with the invention. A transgenic antibody derived from a subject transgenic mammal includes a transgenic antibody produced using an isolated cell or nucleic acid obtained from the subject transgenic animal, or using a cell or nucleic acid derived from an isolated cell or nucleic acid obtained from the subject transgenic animal. In a preferred embodiment, a transgenic antibody comprises an amino acid sequence encoded by an integrated donor polynucleotide or portion thereof.

The term "Ig gene segment" as used herein refers to segments of DNA encoding various portions of an Ig molecule, which are present in the germline of non-human animals and humans, and which are brought together in B cells to form rearranged Ig genes. Thus, "Ig gene segments" as used herein can refer to V gene segments, D gene segments. J gene segments and C region genes, as well as portions thereof.

The term "human Ig gene segment" as used herein includes both naturally occurring sequences of a human Ig gene segment, degenerate forms of naturally occurring sequences of a human Ig gene segment, as well as synthetic sequences that encode a polypeptide sequence substantially identical to the polypeptide encoded by a naturally occurring sequence of a human Ig gene segment. By "substantially" is meant that the degree of amino acid sequence identity is at least about 85%-95%. Preferably, the degree of amino acid sequence identity is greater than 90%, more preferably greater than 95%.

The term "heavy chain-only locus" as defined herein refers to a locus encoding a VH domain in which the first amino acid residue of the antibody FR4 region is positively charged, comprising one or more V gene segments, one or more D gene segment and one or more J gene segments, optionally linked to one or more heavy chain effector region gene segments, each of which encodes an antibody constant effector region lacking CH1 domain functionality. Preferably, the heavy chain-only locus comprises from about five to about twenty V gene fragments, about two to about 40 D gene fragments, and about two to about twenty J gene fragments, where the V/D/J fragments are preferably of human origin. The terms "D gene segment" and "J gene segment" also include within their scope derivatives, homologues and fragments thereof as long as the resultant segment can recombine with the remaining components of a heavy chain antibody locus as herein described to generate a heavy chain-only antibody. D and J gene segments may be derived from naturally-occurring sources or they may be synthesized using methods familiar to those skilled in the art and described herein. In one embodiment, in the J4 gene segment a codon for W (TGG) is replaced by a codon for R (CGG) to encode an R instead of W at the first amino acid position of FR4 (position 101 of the heavy chain-only antibody following Kabat numbering). D and J gene segments may incorporate codons for defined additional amino acid residues or defined amino acid substitutions or deletions to increase CDR3 diversity. The term "V gene segment" encompasses naturally occurring V gene segments derived from a non-human animal, such as a non-human mammal, e g rodent engineered to introduce a positively charged amino acid residue at the first residue of the FR4 region. The "V gene segment" must be capable of recombining with a D gene segment, a J gene segment and a heavy chain constant region, which excludes a CH1 exon, to generate a heavy chain-only antibody herein when the nucleic acid is expressed.

By "human idiotype" is meant a polypeptide sequence epitope present on a human antibody in the immunoglobulin heavy and/or light chain variable region. The term "human idiotype" as used herein includes both naturally occurring sequences of a human antibody, as well as synthetic sequences substantially identical to the polypeptide found in naturally occurring human antibodies. By "substantially" is meant that the degree of amino acid sequence identity is at least about 85%-95%. Preferably, the degree of amino acid sequence identity is greater than 90%, more preferably greater than 95%.

By a "chimeric antibody" or a "chimeric immunoglobulin" is meant an immunoglobulin molecule comprising amino acid sequences from at least two different Ig loci, e.g., a transgenic antibody comprising a portion encoded by a human Ig locus and a portion encoded by a rat Ig locus. Chimeric antibodies include transgenic antibodies with non-human Fc-regions or artificial Fc-regions, and human idiotypes. Such immunoglobulins can be isolated from animals of the invention that have been engineered to produce such chimeric antibodies.

"Binding affinity" refers to the strength of the sum total of noncovalent interactions between a single binding site of a molecule (e.g., an antibody) and its binding partner (e.g., an antigen). Unless indicated otherwise, as used herein, "binding affinity" refers to intrinsic binding affinity which reflects a 1:1 interaction between members of a binding pair (e.g., antibody and antigen). The affinity of a molecule X for its partner Y can generally be represented by the dissociation constant (Kd). The Kd of the HCAbs of the present invention is typically between about 1 pm and about 1 µm For example, the Kd can be about 200 nM, 150 nM, 100 nM, 60 nM, 50 nM, 40 nM, 30 nM, 20 nM, 10 nM, 8 nM, 6 nM, 4 nM, 2 nM, 1 nM, or stronger. Affinity can be measured by common methods known in the art. Low-affinity antibodies generally bind antigen slowly and tend to dissociate readily, whereas high-affinity antibodies generally bind antigen faster and tend to remain.

As used herein, the "Kd" or "Kd value" refers to a dissociation constant measured by using surface plasmon resonance assays, for example, using a BIAcore™-2000 or a BIAcore™-3000 (BIAcore, Inc., Piscataway, N.J.) at 25° C. with immobilized antigen CMS chips at .about.10 response units (RU). For further details see, e.g., Chen et al., *J. Mol. Biol.* 293:865-881 (1999).

An "epitope" is the site on the surface of an antigen molecule to which a single antibody molecule binds. Generally an antigen has several or many different epitopes and reacts with many different antibodies. The term specifically includes linear epitopes and conformational epitopes.

"Polyepitopic specificity" refers to the ability to specifically bind to two or more different epitopes on the same or different target(s).

An antibody binds "essentially the same epitope" as a reference antibody, when the two antibodies recognize identical or sterically overlapping epitopes. The most widely used and rapid methods for determining whether two epitopes bind to identical or sterically overlapping epitopes are competition assays, which can be configured in all number of different formats, using either labeled antigen or labeled antibody. Usually, the antigen is immobilized on a 96-well plate, and the ability of unlabeled antibodies to block the binding of labeled antibodies is measured using radioactive or enzyme labels.

"Epitope mapping" is the process of identifying the binding sites, or epitopes, of antibodies on their target antigens. Antibody epitopes may be linear epitopes or conformational epitopes. Linear epitopes are formed by a continuous sequence of amino acids in a protein. Conformational epitopes are formed of amino acids that are discontinuous in the protein sequence, but which are brought together upon folding of the protein into its three-dimensional structure.

"Tumor", as used herein, refers to all neoplastic cell growth and proliferation, whether malignant or benign, and all pre-cancerous and cancerous cells and tissues. The term "tumor" includes both solid tumors and hematologic cancers.

The terms "cancer" and "cancerous" refer to or describe the physiological condition in mammals that is typically characterized by unregulated cell growth. Examples of cancer include but are not limited to, carcinoma, lymphoma, blastoma, sarcoma, and leukemia. More particular examples of cancers include breast cancer, gastric cancer, squamous cell cancer, glioblastoma, cervical cancer, ovarian cancer, liver cancer, bladder cancer, hepatoma, colon cancer, colorectal cancer, endometrial carcinoma, salivary gland carcinoma, kidney cancer, renal cancer, prostate cancer, vulval cancer, thyroid cancer, hepatic carcinoma, head and neck cancer, rectal cancer, colorectal cancer, lung cancer including small-cell lung cancer, non-small cell lung cancer, adenocarcinoma of the lung and squamous carcinoma of the lung, squamous cell cancer (e.g. epithelial squamous cell cancer), prostate cancer, cancer of the peritoneum, hepatocellular cancer, gastric or stomach cancer including gastrointestinal cancer, pancreatic cancer, glioblastoma, retinoblastoma, astrocytoma, thecomas, arrhenoblastomas, hepatoma, hematologic malignancies including non-Hodgkins lymphoma (NHL), multiple myeloma and acute hematologic malignancies, endometrial or uterine carcinoma, endometriosis, fibrosarcomas, choriocarcinoma, salivary gland carcinoma, vulval cancer, thyroid cancer, esophageal carcinomas, hepatic carcinoma, anal carcinoma, penile carcinoma, nasopharyngeal carcinoma, laryngeal carcinomas, Kaposi's sarcoma, melanoma, skin carcinomas, Schwannoma, oligodendroglioma, neuroblastomas, rhabdomyosarcoma, osteogenic sarcoma, leiomyosarcomas, urinary tract carcinomas, thyroid carcinomas, Wilm's tumor, as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); Hairy cell leukemia; chronic myeloblastic leukemia; and post-transplant lymphoproliferative disorder (PTLD), as well as abnormal vascular proliferation associated with phakomatoses, and Meigs' syndrome.

II. Detailed Description

The HCAbs of the invention are human or chimeric having the native amino acid residue at the first position of the FR4 region (amino acid position 101 according to the Kabat numbering system), substituted by another amino acid residue, which is capable of disrupting a surface-exposed hydrophobic patch comprising or associated with the native amino acid residue at that position. Such hydrophobic patches are normally buried in the interface with the antibody light chain constant region but become surface exposed in HCAbs and are, at least partially, for the unwanted aggregation and light chain association of HCAbs. The substituted amino acid residue preferably is charged, and more preferably is positively charged. The resultant HCAbs preferably have high antigen-binding affinity and solubility under physiological conditions in the absence of aggregation.

Specifically included are heavy-chain only antibodies lacking the camelid VHH framework and mutations, and their functional VH regions. Such heavy-chain only antibodies can, for example, be produced in transgenic rats or mice which comprise fully human heavy chain-only gene loci as described, e.g. in WO2006/008548, but other transgenic mammals, such as rabbit, guinea pig, rat can also be used, rats and mice being preferred. Heavy chain only antibodies, including their VHH or VH functional fragments, can also be produced by recombinant DNA technology, by expression of the encoding nucleic acid in a suitable eukaryotic or prokaryotic host, including E. coli or yeast.

Domains of heavy-chain only antibodies combine advantages of antibodies and small molecule drugs: can be mono- or multi-valent; have low toxicity; and are cost-effective to manufacture. Due to their small size, these domains are easy to administer, including oral or topical administration, are characterized by high stability, including gastrointestinal stability; and their half-life can be tailored to the desired use or indication. In addition, VH and VHH domains of HCAbs can be manufactured in a cost effective manner.

In one embodiment, domains of HCAbs are nanobodies, as hereinabove defined.

In one embodiment, the HCAb binding domains are part of a multi-specific binding protein that bind to multiple different epitopes of the same target antigen or multiple different epitopes on more than one target antigen. In one embodiment, the antibody is a bispecific antibody. Various multi-specific structures comprising human VH binding domains are illustrated in FIG. 7. The multi-specific, or bi-specific, HCAbs of the present invention may, for example, bind to two or more sites on the same soluble target, or two or more sites on the same cell surface (receptor) target, such as tumor antigen, or one or more soluble targets and one or more cell surface receptor targets. In certain embodiments, the bispecific HCAb structures herein have the following binding affinities: epithelial cell adhesion molecule (EpCam)×CD3; CD19×CD3; EpCam× CD3; TNF-α×IL-17; IL-1α×IL-10; CD30×CD16A; human epidermal growth factor receptor 2 (HER2)×HER3; IL-4× IL-13; angiopoietin 2 (Ang-2)×vascular endothelial growth factor a (VEGF-A); Factor IXa×Factor X; epidermal growth factor receptor (EGFR)×HER3; IL-17A×IL-17F; HER2× HER3; carcinoembryonic antigen×CD3; CD20×CD3; CD123×CD3; BCMA×CD3, PSMA×PSCA×CD3, PSMA× CD3, PSCA×CD3, CD19×CD22×CD3, CD22×CD3, CD38×PD1, CD38×PD-L1, CD38×CD73, CD38×CD39, PD1×CD39×CD73, and PD1×CD73.

In a preferred embodiment, the HCAbs herein are produced by transgenic animals, including transgenic mice and rats, preferably rats, in which the endogenous immunoglobulin genes are knocked out or disabled. In a preferred embodiment, the HCAbs herein are produced in UniRat™. UniRat™ have their endogenous immunoglobulin genes silenced and use a human immunoglobulin heavy-chain translocus to express a diverse, naturally optimized repertoire of fully human HCAbs. While endogenous immunoglobulin loci in rats can be knocked out or silenced using a variety technologies, in UniRat™ the zinc-finger (endo) nuclease (ZNF) technology was used to inactivate the endogenous rat heavy chain J-locus, light chain Cκ locus and light chain Cλ locus. ZNF constructs for microinjection into oocytes can produce IgH and IgL knock out (KO) lines. For details see, e.g. Geurts et al., 2009, *Science* 325:433 Characterization of Ig heavy chain knockout rats has been reported by Menoret et al., 2010, *Eur. J. Immunol.* 40:2932-2941. Advantages of the ZNF technology are that non-homologous end joining to silence a gene or locus via deletions up to several kb can also provide a target site for homologous integration (Cui et al., 2011, *Nat Biotechnol* 29:64-67. UniRat™ HCAbs bind epitopes that cannot be attacked with conventional antibodies. Their high specificity, affinity, and small size make them ideal for mono- and poly-specific applications.

Figure 5:
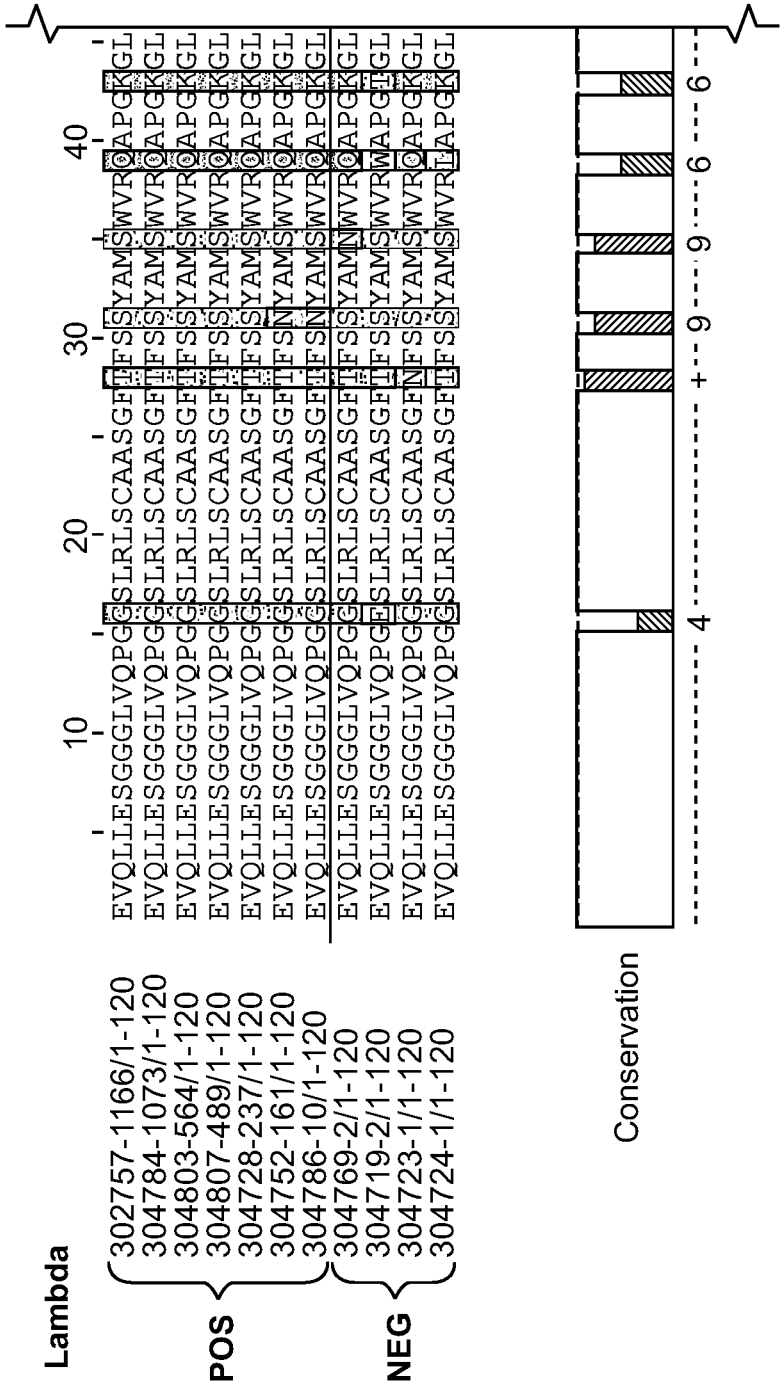
FIG. 5 Free lambda protein association with heavy chain antibodies in the same CDR3 family. The figure shows a multiple sequence alignment of 11 VH sequences from heavy chain antibodies in the same CDR3 family (SEQ ID NOS 48-58, respectively, in order of appearance). All of these sequences contain a W at position 101.
Figure 5:
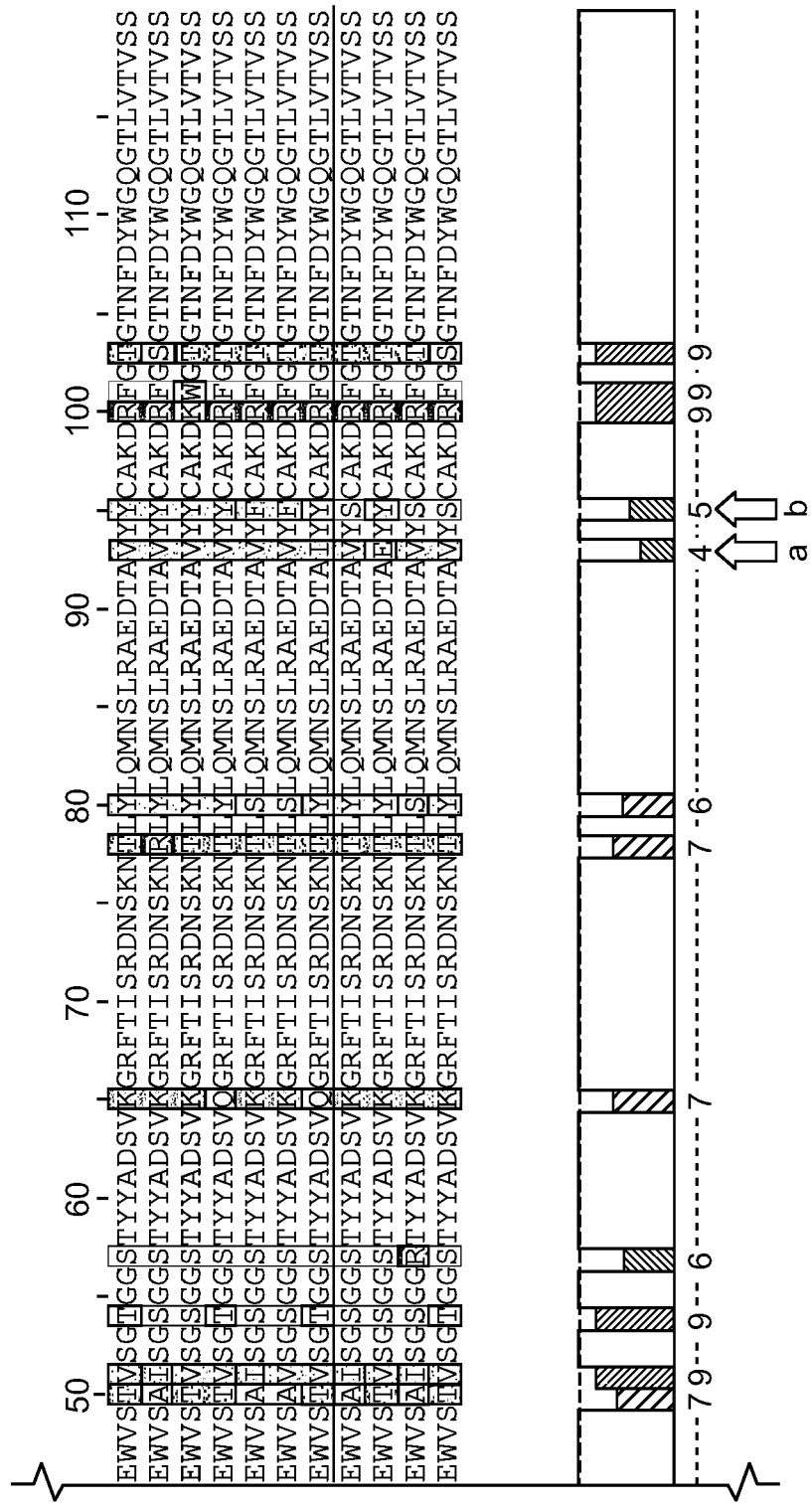

In the heavy chain-only antibodies of the present invention the native amino acid residue at the first position of the fourth framework region (FR4) is replaced by a different amino acid residue, that is capable of disrupting a surface-exposed hydrophobic patch comprising or associated with the native amino acid residue at that position. In one embodiment, the substituted amino acid residue is charged. In another embodiment, the substituted amino acid residue is positively charged, such as lysine (Lys, K), arginine (Arg, R) or histidine (His, H), preferably arginine (R). As shown in the alignment of FIG. 5 VH sequences from heavy chain antibodies in the same CDR3 family all contain a Trp (W) at position 101, thus in a preferred embodiment the heavy chain-only antibodies derived from the transgenic animals of the present invention contain a Trp to Arg mutation at position 101.

The human or chimeric heavy chain-only antibodies of the present invention can be generated against any desired target antigen and have great potential for a variety of clinical applications. Target antigens for therapeutic applications include, without limitation, EGFR, ErbB2 (HER2), ErbB3 (HER3), ErbB4 (HER4), CTLA-4/CD152, RANKL, TNF-α, CD20, IL-12/IL-23, IL1β, IL-17A, IL-17F, CD38, NGF, IGF-1, IL-12, CD20, CD30, CD39, CD73, CD40, PD-1, PDL-1, PD-L2, BCMA, BTLA, thymic stromal lymphopoietin (TSP), Follicle Stimulating Hormone Receptor (FSHR), Prostate Specific Membrane Antigen (PSMA), Prostate Stem Cell Antigen (PSCA), CD137, OX-40, and IL-33. Therapeutic indications include, without limitation, treatment of solid tumors, hematologic tumors, inflammatory diseases, such as rheumatoid arthritis, psoriasis, Crohn's disease, ulcerative colitis, metabolic disorders, cardiovascular diseases, respiratory, dermatologic, central nervous system, hematologic, eye/ear, liver diseases.

Target tumors include, for example, breast cancer, gastric cancer, squamous cell cancer, glioblastoma, cervical cancer, ovarian cancer, liver cancer, bladder cancer, hepatoma, colon cancer, colorectal cancer, endometrial carcinoma, salivary gland carcinoma, kidney cancer, renal cancer, prostate cancer, vulval cancer, thyroid cancer, hepatic carcinoma, head and neck cancer, rectal cancer, colorectal cancer, lung cancer including small-cell lung cancer, non-small cell lung cancer, adenocarcinoma of the lung and squamous carcinoma of the lung, squamous cell cancer (e.g. epithelial squamous cell cancer), prostate cancer, cancer of the peritoneum, hepatocellular cancer, gastric or stomach cancer including gastrointestinal cancer, pancreatic cancer, glioblastoma, retinoblastoma, astrocytoma, thecomas, arrhenoblastomas, hepatoma, hematologic malignancies including non-Hodgkins lymphoma (NHL), multiple myeloma (MM) and acute hematologic malignancies, endometrial or uterine carcinoma, endometriosis, fibrosarcomas, choriocarcinoma, salivary gland carcinoma, vulval cancer, thyroid cancer, esophageal carcinomas, hepatic carcinoma, anal carcinoma, penile carcinoma, nasopharyngeal carcinoma, laryngeal carcinomas, Kaposi's sarcoma, melanoma, skin carcinomas, Schwannoma, oligodendroglioma, neuroblastomas, rhabdomyosarcoma, osteogenic sarcoma, leiomyosarcomas, urinary tract carcinomas, thyroid carcinomas, Wilm's tumor, as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); Hairy cell leukemia; chronic myeloblastic leukemia; and post-transplant lymphoproliferative disorder (PTLD), as well as abnormal vascular proliferation associated with phakomatoses, and Meigs' syndrome.

Further details of the invention are illustrated by the following non-limiting Examples, which use the following abbreviations:
BAC Bacterial artificial chromosome
YAC Yeast artificial chromosome
ZFN Zinc-finger nuclease
H Heavy chain
C Constant region
V Variable region
D Diversity segment
J Joining segment

EXAMPLES

Example 1: Generation of Genetically Engineered Rats Expressing Heavy Chain-Only Antibodies (HCAbs)

Previously identified, characterized and, in part, modified BACs and YACs accommodate human heavy chain variable region genes and rat constant region genes (Osborn et al., 2013, *J. Immunol.* 190:1481-1490; Ma et al., 2013, *J. Immunol. Methods* 400-401:78-86). To enable heavy-chain antibody expression, a rat constant region BAC was modified by removal of Cµ and deletion of $C_H1$ exons in all Cγs. Heavy-chain-only expression was then enforced by silencing of the endogenous heavy and light chain (kappa and lambda) loci.

Construction of Modified Human IgH Loci on YACs and BACs.

A 'human-rat' IgH locus was constructed and assembled in several parts. This involved the modification and joining of rat C region genes downstream of human $J_H$s and subsequently, the upstream addition of the human $V_H$6-D-segment region. Two BACs with separate clusters of human $V_H$ genes [BAC6 and BAC3] were then co-injected with the BAC termed Georg, encoding the assembled and modified region comprising human $V_H$6-all Ds-all $J_H$s-rat Cγ2a/1/2b ($\Delta C_H1$).

For the introduction of modifications at precise locations in the DNA sequence and for simultaneously joining multiple large DNA regions, technologies were developed to assemble sequences with overlapping ends in *S. cerevisiae* as circular YAC (cYAC) and, subsequently, to convert such cYACs into BACs. Advantages of YACs include their capacity to retain large DNA inserts, the ease of homologous alterations in the yeast host and the maintenance of sequence stability especially in the highly repetitive regions (e.g. switch regions, enhancers). On the other hand BACs, propagated in *E. coli*, offer the advantages of easy preparation and large yield. In addition, detailed restriction mapping and sequence analysis can be better achieved from BACs than YACs. Two self-replicating *S. cerevisiae/E. Coli* shuttle vectors, pBelo-CEN-URA and pCAU were constructed. Briefly, *S. cerevisiae* CEN4 was cut out as an AvrII fragment from pYAC-RC (Marchuk and Collins, 1988; *Nucleic Acids Res.* 16(15):7743) and ligated to SpeI-linearised pAP599 (Ma et al. *Mol Microbiol.* 2007; 66(1):14-25). The resulting plasmid contains CEN4 cloned downstream of URA3. From this, an ApaLI-BamHI URA3-CEN4 fragment was cut out, and ligated to ApaLI and BamHI digested pBACBelo11 (New England Biolabs) to yield pBelo-CEN-URA. The *S. cerevisiae* autonomously replicating sequence ARS209 was synthesized and cloned into a unique SexAI site in pBelo-CEN-URA to yield pCAU.

To facilitate the modifications of human $J_H4$, rat Cμ and Cγ1 regions, a ~37 kb SacII-fragment spanning from ~2.2 kb upstream of the human $J_H$s to ~5.5 kb downstream of the rat Cγ1 coding region was cut out from the BAC construct Annabel (Osborn et al., 2013; *J. Immunol.* 190:1481-1490) and cloned into a unique SacII site in pBelo-CEN-URA [pBelo+SacII, 37 kb]. In addition, to modify the rat Cγ2b region, a ~19 kb SacII-SwaI fragment from Annabel spanning from ~6.9 kb upstream of the γ2b switch region to ~2.0 kb downstream of the Cγ2b coding region was cloned into SacII and HpaI-double digested pBelo-CEN-URA [pBelo+SacII-SwaI, 19 kb]. Both plasmids were used as templates for amplifying various human and rat genomic regions and to establish the required restriction fragments.

The DNA region spanning from ~3.1 kb upstream of the human $J_H$s and including rat Cμ with some 3' region was modified and assembled in pCAU as a 16.7 kb SnaBI-FspI fragment. The modified region includes all authentic human $J_H$s except a T→C point mutation being introduced into $J_H4$ (resulting into a W→R amino acid change) followed by the rat intergenic region from the $J_H$s until μCH1, which was deleted along with the rest of Cμ coding region and replaced precisely by rat Cγ2a sequence lacking $C_H1$ (starting from the intron immediately upstream of Hinge to the 3' end of the membrane exons). This construct was derived by the assembly of the following 5 overlapping fragments in yeast as cYAC and then converted into a BAC: an amplified ~4.3 kb fragment using primers HC27-1 and -2 covering the region upstream of human $J_H$ to mutated $J_H4$ (the point mutation introduced via the latter primer indicated by Ⓒ), an amplified ~3.4 kb fragment using primers HC27-3 and -4 spanning from mutated $J_H4$ (indicated by Ⓒ) to upstream of the μ switch region, a ~5.2 kb AflII-fragment encompassing the μ switch region and the flanking sequences cut out from pBelo+SacII 37 kb, an amplified rat Cγ2a lacking $C_H1$ fused to sequences flanking rat Cμ using long primers HC27-5 and -6, and amplification of the pCAU vector using primers HC27-7 and -8. This resulted in pCAU+HuJ-Rat Cγ2a(-CH1). All modified regions were checked by sequencing to confirm the accuracy.

Rat Cγ1 lacking $C_H1$ and Cγ2b lacking $C_H1$ were individually generated via PCR. A ~1.7 kb fragment located immediately upstream of the Cγ1 coding region with a 3' tail matching the 5' end of the intron between $C_H1$ and hinge was amplified using primers HC27-9 and -10. Cγ1 was amplified as a ~3.9 kb fragment from the intron between $C_H1$ and hinge to the 3' end of the coding region using primers HC27-11 and -12. Subsequently, the ~1.7 kb and ~3.9 kb fragments were both gel purified and joined via overlapping PCR using primers HC27-9 and -12 to yield a ~5.6 kb fragment. Similarly, for Cγ2b without $C_H1$, a ~0.3 kb fragment upstream of the Cγ2b coding region was amplified using primers HC27-13 and -14, and a ~5.4 kb fragment—spanning the area from the intron between $C_H1$ and hinge to the 3' end of the coding region—was amplified using primers HC27-15 and -16, and subsequently, these two fragments were joined via overlapping PCR using primers HC27-13 and -16 to yield a ~5.7 kb fragment. pCAU+Rat Cγ1, 2b(-CH1s) was constructed to contain the following: 100 bp homology region matching the 3' end of rat Cμ, followed by Cγ1 and Cγ2b in the genomic configuration except the $C_H1$s of both were deleted. Six overlapping fragments were used to construct pCAU+Rat Cγ1, 2b(-CH1s): a ~10.2 kb SpeI-NarI fragment spanning from the 3' Cμ homology region followed by the γ1 switch region cut out from pBelo+SacII, 37 kb, the ~5.6 kb PCR fragment containing Cγ1 without $C_H1$ as described above, an amplified ~7.4 kb fragment covering the intergenic region between Cγ1 and Cγ2b using primers HC27-17 and -18, a ~11.3 kb XhoI fragment encompassing the rat Cγ2b switch region cut out from pBelo+SacII-SwaI 19 kb, the ~5.7 kb PCR fragment containing Cγ2b without $C_H1$, and the amplified pCAU vector using primers HC27-19 and -20. The rat genomic region in pCAU+Rat Cγ1, 2b(-CH1s) can be cut out as a single ~40 kb FspI fragment.

Finally, the BAC (Georg) encoding the human $V_H6$-Ds-$J_H$s-rat C regions with all the modifications was assembled using the following four overlapping fragments: a purified ~78.2 kb FspAI-MluI fragment encompassing the human $V_H6$-Ds region cut out from BAC10 (CTD-3216M13, Invitrogen), the 16.7 kb SnaBI-FspI fragment cut out from pCAU+HuJ-Rat Cγ2a(-CH1) as described above, the ~40 kb FspI fragment cut out from pCAU+Rat Cγ1, 2b(-CH1s), and a purified ~77.2 kb SwaI-SacII fragment cut out from construct Annabel which includes the intergenic region between Cγ2b and $C_ε$ followed by $C_ε$, $C_α$, the 3' enhancer region, the pBelo-CEN-URA vector, and the 5' region upstream of human $V_H6$. This final construct was checked extensively via restriction mapping and partial sequencing. The (human $V_H6$-Ds-$J_H$s-rat C) region can be cut out and purified as a ~201 kb NotI fragment.

BAC6 contains the human genomic region from VH4-39 to VH3-23, while BAC3 contains a downstream region from VH3-11 to VH6-1 (the most D proximal VH gene). To provide an overlap between BAC6 and BAC3, a 10.6 kb fragment located at the 5' end of the human $V_H$ loci in BAC3 was integrated downstream of VH3-23 in BAC6 as described previously (Osborn et al. 2013, supra). The human $V_H$ genes in BAC6 were cut out as a ~182-kb AsiSI-AscI fragment. BAC3 was unmodified and the human $V_H$ genes in this BAC were cut out as a ~173 kb NotI-fragment.

Oligonucleotides:

HC27-1:
(SEQ ID NO: 1)
GTATTACACACAAAATGGGAAAAGCTG

HC27-2:
(SEQ ID NO: 2)
CCⒼGTAGTCAAAGTAGTCACATTGTGGGAGGC

HC27-3:
(SEQ ID NO: 3)

```
CCTTAATGGGGCCTCCCACAATGTGACTACTTTGACTACGGGGGCCAGGG

AACCCTGGTCACCG
```

HC27-4:
(SEQ ID NO: 4)
```
GAATCCTAGGATTGCCTTCTTAGCCTG
```

HC27-5:
(SEQ ID NO: 5)
```
CCATAGACCAAACTTACCTACTATCTAGTCCTGCCAACCTTAAGAGCAGC

AACATGGAGACAGCAGAGTGTAGAGAGATCTCCTGACTGGCAGGAGGCAA

GAAGATGGATTCTTACTCGTCCATTTCTCTTTTATCCCTCTCTGGTCCTA

GAGAACAACCAGGGGATGAGGGGCTC
```

HC27-6:
(SEQ ID NO: 6)
```
GCACAAGTGGACAAAGTCTTTGGCCAGTCTAGAAAGAAGCCCGTCTCAGA

GATCAAAGCTGGAGGGCAACACAGGAAAGATGTGGGAATAAGTTTACTAG

TCATACAGGCAGGAACCCCAGGCCCAGAGGTAGTGTCCCTGTGGGAGGGT

CTCTTGCTCTCTGATGTCCTTCCATGCTGAGAGTTAGGGCCCTTGTCCAA

TCATGTTC
```

HC27-7:
(SEQ ID NO: 7)
```
GAATTTTGCCCAAGTTTTTTCAGCTTTTCCCATTTTGTGTGTAATACGTA

CACACCGCAGGGTAATAACTG
```

HC27-8:
(SEQ ID NO: 8)
```
GACGGGCTTCTTTCTAGACTGGCCAAAGACTTTGTCCACTTGTGCGCAGT

TATCTATGCTGTCTCACCATAGAG
```

HC27-9:
(SEQ ID NO: 9)
```
GGAGGTCTAGGCTGGAGCTGATCCAG
```

HC27-10:
(SEQ ID NO: 10)
```
CCTCGTCCCCTGGTTGTTCTCTCAAGAAAAAGTATGCGTGATCATTTTGT

C
```

HC27-11:
(SEQ ID NO: 11)
```
AGAGAACAACCAGGGGACGAGG
```

HC27-12:
(SEQ ID NO: 12)
```
GTCCACATAGTCCTCCAGAGAGAGAAG
```

HC27-13:
(SEQ ID NO: 13)
```
GACCCAAGTCCAGTTCCCAACAACCAC
```

HC27-14:
(SEQ ID NO: 14)
```
CCTCGTCCCCTGGTTGTCCTCTCAAGAGAGGAGGGAGTGTGAGCTTTTCC
```

HC27-15:
(SEQ ID NO: 16)
```
AGAGGACAACCAGGGGACGAGGGGCTC
```

HC27-16:
(SEQ ID NO: 17)
```
GCATGGGGAAGGGGCATTGTATGTAGG
```

HC27-17:
(SEQ ID NO: 18)
```
CAGATCACACTGTCTGCTCACTTCAC
```

HC27-18:
(SEQ ID NO: 19)
```
AAGGCAGCAGGATGGAAGCTGATGTCG
```

HC27-19:
(SEQ ID NO: 20)
```
GCTGGAGGGCAACACAGGAAAGATGTGGGAATAAGTTTACTAGTCATACA

GGCAGGAACCCCAGGCCCAGAGGTAGTGTCCCTGTGGGAGGGTCTCTTGC

GCACACACCGCAGGGTAATAACTG
```

HC27-20:
(SEQ ID NO: 21)
```
GATTTAAATGTCAATTGGTGAGTCTTCTGGGGCTTCCTACATACAATGCC

CCTTCCCCATGCGCAGTTATCTATGCTGTCTCACCATAGAG
```

Construction of Georg II

A 'human-rat' IgH locus was constructed and assembled in several parts. This involved the modification and joining of rat C region genes downstream of mutated human $J_{H1}$-$J_{H6}$ each containing a point mutation encoding W→R and subsequently, the upstream addition of the human $V_H$6-1-D-segment region. This BAC is named as Georg II.

Firstly, the mutated human $J_{H1}$-$J_{H6}$ is synthesized in a 2.3 kb ScaI fragment (Thermo Fisher Scientific, see below).

Secondly, the mutated human $J_{H1}$-$J_{H6}$ is joined with ~3.1 kb DNA region upstream of human $J_{H}$s and ~11.4 kb region spanning from rat sequence immediately downstream of $J_{Hs}$ to rat Cμ whose coding region has been replaced by rat Cγ2a coding region but lacking $C_H1$ in a BAC termed pCAU+HuJ(W-R)-Rat Cγ2a(-CH1). The entire modified region in this BAC can be cut out as a 16.7 kb SnaBI-FspI fragment. This BAC was derived by the assembly of the following 4 overlapping fragments in yeast as cYAC and then converted into a BAC: an amplified ~2.7 kb fragment using primers HC32-1 and -2 covering the region upstream of human $J_{Hs}$, the 2.3 kb mutated human $J_{H1}$-$H_{H6}$. ScaI fragment, an amplified ~2.1 kb fragment using primers HC32-3 and -4 covering rat region immediately downstream of $J_{Hs}$, and a ~18.4 kb MluI-HpaI fragment cut out from pCAU+HuJ-Rat Cγ2a(-CH1) (containing rat Cμ locus with coding region replaced by rat Cγ2a coding region lacking $C_H1$ and pCAU vector, described in 'HC27 construction method'). All modified regions were checked by sequencing to confirm the accuracy.

Finally, Georg II encoding the human $V_H$6-1-Ds-mutated $J_H$s-modified rat C regions was assembled using the following 4 overlapping fragments: a purified ~78.2 kb FspAI-MluI fragment encompassing the human $V_H$6-1-Ds region cut out from BAC10 (CTD-3216M13, Invitrogen), the 16.7 kb SnaBI-FspI fragment cut out from pCAU+HuJ(W-R)-Rat Cγ2a(-CH1) as described above, the ~40 kb FspI fragment cut out from pCAU+Rat Cγ1, 2b(-CH1s) (described in 'HC27 construction method'), and a purified ~77.2 kb SwaI-SacII fragment cut out from construct Annabel which includes the intergenic region between Cγ2b and $C_ε$ followed by $C_ε$, $C_α$, the 3' enhancer region, the pBelo-CEN-URA vector, and the 5' region upstream of human $V_H$6-1. This final construct was checked extensively via restriction mapping and partial sequencing. The (human $V_H$6-1-Ds-mutated $J_H$s-modified rat C) region can be cut out and purified as a ~201 kb NotI fragment.

Microinjection to Generate HC32 and HC33 Transgenic Rats

BAC6 contains the human genomic region from VH4-39 to VH3-23, while BAC3 contains a downstream region from VH3-11 to VH6-1 (the most D proximal VH gene). To provide an overlap between BAC6 and BAC3, a 10.6 kb fragment located at the 5' end of the human $V_H$ loci in BAC3 was integrated downstream of VH3-23 in BAC6 as described previously (Osborn et al. 2013, *J. Immunol.* 190: 1481-1490). The human $V_H$ genes in BAC6 were cut out as a ~182-kb AsiSI-AscI fragment. BAC3 was unmodified and the human $V_H$ genes in this BAC were cut out as a ~173 kb NotI-fragment. Both fragments were purified and co-injected with the ~201 kb NotI fragment from Georg II into rat embryos to construct HC32.

BAC9 contains the human genomic region from VH3-74 to VH3-53. BAC(14+5) contains a downstream region from VH3-53 to VH3-13 and a 6.1 kb region immediately upstream of VH6-1 was added to its 3' to provide an overlap to Georg II. The human $V_H$ region in BAC9 was cut out as a ~185 kb NotI fragment, and that from BAC(14+5) was cut out as a ~209 kb BsiwI fragment. Both fragments were purified and co-injected with the ~201 kb NotI fragment from Georg II into rat embryos to construct HC33.

DNA Purification

Linear YACs, circular YACs and BAC fragments after digests, were purified by electro-elution using Elutrap™ (Schleicher and Schuell) (Gu et al., *J. Biochem. Biophys Methods.*, 1992, 24:45-50) from strips cut from 0.8% agarose gels run conventionally or from pulsed-field-gel electrophoresis (PFGE). The DNA concentration was usually several ng/μl in a volume of ~100 μl. For fragments up to ~200 kb the DNA was precipitated and re-dissolved in micro-injection buffer (10 mM Tris-HCl pH 7.5, 100 mM EDTA pH 8 and 100 mM NaCl but without Spermine/Spermidine) to the desired concentration.

The purification of circular YACs from yeast was carried out using Nucleobond AX silica-based anion-exchange resin (Macherey-Nagel, Germany). Briefly, spheroplasts were made using zymolyase or lyticase and pelleted (Davies et al., 1996, Human antibody repertoires in transgenic mice: manipulation of transfer of YACs. In *Antibody Engineering: A Practical Approach*. J. McCafferty, H. R. Hoogenboom, and D. J. Chiswell eds. IRL, Oxford, U.K., p. 59-76). The cells then underwent alkaline lysis, binding to AX100 column and elution as described in the Nucleobond method for a low-copy plasmid. Contaminating yeast chromosomal DNA was hydrolyzed using Plasmid-Safe™ ATP-Dependent DNase (Epicentre Biotechnologies) followed by a final cleanup step using SureClean (Bioline). An aliquot of DH10 electrocompetent cells (Invitrogen) was then transformed with the circular YAC to obtain BAC colonies. For the separation of the insert DNA for microinjection, 150-200 kb, from BAC vector DNA, ~10 kb, a filtration step with Sepharose 4B-CL was used (Yang et al., 1997, *Nat. Biotechnol.* 1997, 15; 859-865).

Gel Analyses

Purified YAC and BAC DNA was analyzed by restriction digest and separation on conventional 0.7% agarose gels (Sambrook and Russell, 2001). Larger fragments, 50-200 kb, were separated by PFGE (Biorad Chef Mapper™) at 8° C., using 0.8% PFC Agarose in 0.5% TBE, at 2-20 sec switch time for 16 h, 6V/cm, 10 mA. Purification allowed a direct comparison of the resulting fragments with the predicted size obtained from the sequence analysis. Alterations were analyzed by PCR and sequencing.

Microinjection

Outbred SD/Hsd strain animals were housed in standard microisolator cages under approved animal care protocols in animal facility that is accredited by the Association for the Assessment and Accreditation for Laboratory Animal Care (AAALAC). The rats were maintained on a 14-10 h light/dark cycle with ad libitum access to food and water. Four to five week old SD/Hsd female rats were injected with 20-25 IU PMSG (Sigma-Aldrich) followed 48 hours later with 20-25 IU hCG (Sigma-Aldrich) before breeding to outbred SD/Hsd males. Fertilized 1-cell stage embryos were collected for subsequent microinjection. Manipulated embryos were transferred to pseudopregnant SD/Hsd female rats to be carried to parturition.

Purified DNA encoding recombinant immunoglobulin loci was resuspended in microinjection buffer with 10 mM Spermine and 10 mM Spemidine. The DNA was injected into fertilized oocytes at various concentrations from 0.5 to 3 ng/μl.

Plasmid DNA or mRNA encoding ZFNs specific for rat immunoglobulin genes were injected into fertilized oocytes at various concentrations from 0.5 to 10 ng/ul.

Zinc-Finger Nucleases (ZFNs)

ZFNs specific for rat immunoglobulin genes were generated.

The ZFN specific for rat Ckappa had the following binding site:

```
                                          (SEQ ID NO: 22)
    ATGAGCAGCACCCTCtcgttgACCAAGGCTGACTATGAA
```

ZFNs specific for rat J-locus sequences had the following binding sites:

```
                                          (SEQ ID NO: 23)
    CAGGTGTGCCCATCCagctgaGTTAAGGTGGAG
    and
                                          (SEQ ID NO: 24)
    CAGGACCAGGACACCTGCAgcagcTGGCAGGAAGCAGGT
```

ZFNs specific for rat Cγ-locus sequences had the following binding sites:

```
                                          (SEQ ID NO: 25)
    AACAGCCATTTGcagaccAAAGGGAAGGAAAGA
    and
                                          (SEQ ID NO: 26)
    TTCTACCCTGGTGTTATGacagtgGTCTGGAAGGCAGATGGT
```

Rats with Transloci.

Transgenic rats carrying artificial heavy chain immunoglobulin loci in unrearranged configuration were generated. RT-PCR and serum analysis (ELISA) of transgenic rats revealed productive rearrangement of transgenic immunoglobulin loci and expression of heavy chain only antibodies of various isotypes in serum. Immunization of transgenic rats resulted in production of high affinity antigen-specific heavy chain only antibodies.

Novel Zinc-Finger-Nuclease Knock-Out Technology.

For further optimization of heavy chain-only antibody generation in transgenic rats, knockout rats with inactivated endogenous rat immunoglobulin loci were generated.

For the inactivation of rat heavy immunoglobulin heavy chain expression and rat a light chain expression, ZFNs were microinjected into single cell rat embryos. Subsequently, embryos were transferred to pseudopregnant female rats and carried to parturition. Animals with mutated heavy chain and light chain loci were identified by PCR. Analysis of such animals demonstrated inactivation of rat immunoglobulin heavy and light chain expression in mutant animals.

Example 2: Generation of Antigen-Specific Heavy Chain-Only Antibodies (HCAbs) in Rats For the generation of antigen-specific heavy chain-only antibodies in rats, genetically engineered rats expressing heavy chain only antibodies, such as those described in Example 1, are immunized in various ways.

Immunization with Inactivated Virus

Influenza viruses with various different hemagglutinin and neuraminidase genes is provided by the Immunology and Pathogenesis Branch, Influenza Division, CDC, Atlanta, Ga. Virus stock is propagated in the allantois cavities of 10-day-old embryonated chicken eggs and purified through a 10%-50% sucrose gradient by means of ultracentrifugation. Viruses are resuspended in phosphate-buffered saline and inactivated by treatment with 0.05% formalin at 4° C. for 2 weeks. Inactivated virus and alumn solution (Pierce) are mixed in a 3:1 ratio and incubated at room temperature for 1 h before immunization. Genetically engineered rats expressing heavy chain-only antibodies are immunized with whole inactive.

Immunization with Proteins or Peptides

Typically immunogens (proteins or peptides like human immunoglobulin kappa light chain, human IgM or IgG heavy chain, human serum albumin, protein-peptide conjugates) are diluted to 0.05-0.15 ml with sterile saline and combined with adjuvant to a final volume of 0.1-0.3 ml. Many appropriate adjuvants are available (i.e. heat inactivated *Bordetella pertussis*, aluminium hydroxide gel, Quil A or saponin, bacterial lipopolysaccharide or anti-CD40) but none have the activity of Complete Freund's Adjuvant (CFA) and Incomplete Freund's Adjuvant (IFA). The concentration of soluble immunogens such as proteins and peptides may vary between 5 µg and 5 mg in the final preparation. The first immunization (priming) with immunogen in CFA is administered intraperitoneally and/or subcutaneously and/or intramuscularly. If intact cells are used as immunogens they are best injected intraperitoneally and/or intravenously. Cells are diluted in saline and 1 to 20 million cells are administered per injection. Cells that survive in the rat will yield best immunization results. After the first immunization with immunogens in CFA a second immunization in IFA (booster) is usually delivered 4 weeks later. This sequence leads to the development of B cells producing high affinity antibodies. If the immunogen is weak booster immunizations are administered every 2 weeks until a strong humoral response is achieved. The immunogen concentrations can be lower in booster immunizations and intravenous routes can be used. Serum is collected from rats every 2 weeks to determine the humoral response.

Immunization with the Lipid II pentapeptides, Penicillin Binding Proteins, beta-lactamases, Sortases, and other membrane proteins of prokaryotes is conducted as outlined above.

Immunization with Lipids, Glycolipids, and Carbohydrate Polymers

Immunization with poly-N-acetyl-β-(1-6)-glucosamine (PNAG) and Other Carbohydrate Polymers Purified dPNAG, PNAG or other carbohydrate polymers are conjugated to Diptheria Toxin, albumin or other carrier protein by reductive amination. Aldehyde groups are first introduced onto the surface of the carrier protein by treatment with glutaraldehyde. Activated carrier proteins are subsequently reacted with dPNAG (or other carbohydrate polymers) through its free amino groups in the presence of the reducing agent sodium NaCNBH3. Animals are immunized with PNAG and dPNAG-DT conjugates subcutaneously or footpads at day 0 and boosted at subsequent weeks with 0.15-100-µg doses of conjugated PNAG or dPNAG in Complete Freunds Adjuvant or other Adjuvants. Boost immunizations are preferably in Incomplete Freunds. Blood is withdrawn weekly specific antibody titers are determined by ELISA. B cells are recovered from draining lymph nodes or spleen and hybridomas generated using standard methods. Alternatively, yeast cells are used to select for antigen-binding antibodies or fragments.

Immunization with Lipid II

Purified Lipid II with a C55 or shorter lipid tail are mixed with Titermax, liposomes, Ribi adjuvant or other adjuvants. In addition, proteins, such as KLH or ovalbumin, and immunostimulatory compounds, such as lipid A or Complete Freunds Adjuvant, are added to the mix. The primary immunization is performed with 0.1-1 mg of Lipid II in the footpad or subcutaneously at day 0 and boosted at subsequent weeks with 0.15-100-µg doses of conjugated PNAG or dPNAG in Complete Freunds Adjuvant or other Adjuvants. Boost immunizations are preferably in Incomplete Freunds. Blood is withdrawn weekly specific antibody titers are determined by ELISA. B cells are recovered from draining lymph nodes or spleen and hybridomas generated using standard methods. Alternatively, yeast cells are used to select for antigen-binding antibodies or fragments.

Immunization with Lipid A

Core-lipid A is prepared according to the method of Bogard et al., 1987, *Infection and Immunity*, 55:4, 899-908. *Acinetobacter baumannii* ATCC 19606 or other Gram-negative bacteria are cultured in Luria broth, collected by centrifugation, suspended in freeze-drying medium to a cell density of 109 CFU/mL and placed into pre-weight ampoule or glass vial to fill no more than ⅓ of the volume. Sterile cotton or glass wool is inserted into the neck of the ampoule or a bung is inserted into the vial. Sample is frozen slowly in an ultra low freezer and then the vacuum is applied overnight for primary drying. Secondary drying is performed by increasing the temperature to 20° C. for several hours. Lyophilized samples is stored at 4° C. 10 mg of the lyophilized cells is suspended in 400 µL of isobutyric acid and 1M ammonium hydroxide (5:3, v/v) and incubated in a screw-cap test tube with stir bar at 100° C. for 2 hours. Samples is cooled in ice water and centrifuged at 2000×g for 15 minutes. The supernatant is transferred to a new tube, diluted with equal part water and lyophilized. The sample is washed twice with 400 µL of methanol and centrifuged at 2000×g for 15 minutes and the bottom organic layers plus their interfaces are saved and dried under a stream of nitrogen. Five milligrams of Lipid A is then suspended in 5 ml of 0.5% (wt/vol) triethylamide. (Sigma, St. Louis, Mo.) after which 5 mg of acid-treated bacteria is added. The mixture was stirred slowly for 30 min at room temperature and dried in vacuo with a Speed Vac centrifuge.

Lipid A-coated cells are used to immunize animals intraperitoneally or footpad. A dose of 50 µl of core LPS-coated cell suspension per injection was used in a 1:1 mixture with Freund's incomplete adjuvant (Difco) (De Kievit & Lam, Journal of Bacteriology, December 1994, p. 7129-7139). Animals are immunized on days 0, 4, 9, 14, and 28. Hybridoma cell lines are screened for the production of anti-LPS antibodies by enzyme-linked immunosorbent assay (ELISA) and LPS purified from different sources (Avanti Polar Lipids, Alabaster, Ala). Supernatants are also tested on heat-killed or life gram-negative bacteria such as *Klebsiella, E. coli, Pseudomonas aeruginosa, Acitenobacter*

*Baumanii*, and *Salmonella*. Broadly reactive antibodies are selected and competition assays with Polymyxin B are performed.

Minimum Inhibitory Concentration (MIC) of HCAbs

A variety of laboratory methods can be used to measure the in vitro susceptibility of bacteria to antimicrobial agents. Either broth or agar dilution methods may be used to measure quantitatively the in vitro activity of an antimicrobial agent against a given bacterial isolate. To perform the tests, a series of tubes or plates is prepared with a broth or agar medium to which various concentrations of the antimicrobial agents are added. The tubes or plates are then inoculated with a standardized suspension of the test organism. After overnight incubation at 35±2° C., the tests are examined and the minimal inhibitory concentration (MIC) is determined. The final result is significantly influenced by methodology, which must be carefully controlled if reproducible results (intralaboratory and interlaboratory) are to be achieved. The MIC obtained using a dilution test tells the concentration of antimicrobial agent required to inhibit the infecting organism. The MIC, however, does not represent an absolute value. The "true" MIC is somewhere between the lowest test concentration that inhibits the organism's growth (that is, the MIC reading) and the next lower test concentration. If, for example, twofold dilutions were used and the MIC is 16 µg/mL, the "true" MIC would be between 16 and 8 µg/mL. Even under the best of controlled conditions, a dilution test may not yield the same end point each time it is performed. Generally, the acceptable reproducibility of the test is within one twofold dilution of the actual end point.

In vitro activity of the antibodies or fragments thereof and comparator antibiotics (Vancomycin, Polymyxins, Cephalosporins, or other beta-lactams) will be tested by Broth Microdilution MIC assay according to the standard CLSI methodology (Clinical and Laboratory Standards Institute. 2003. Methods for dilution antimicrobial susceptibility tests for bacteria that grow aerobically. Approved standard M7-A7).

Activity of antibodies or fragments thereof are tested against *Staphylococcus aureus* ATCC 29213, Gram-positive and Gram-negative bacteria. MIC is determined as follows:

1. Bacterial inoculum preparation. Pick single colony of each strain from the fresh plate (less than 1 week old) and transfer to 5 ml of cation adjusted Muller-Hinton Broth (CAMHB). Incubate in a 37° C. shaker overnight.
2. The next morning, do a 1:100 dilution of the overnight cultures (50 ul into 5 ml). Incubate 2-4 hours in a 37° C. shaker.
3. After 2-4 hrs (absorbance aprox. 0.3-0.5 at 600 nm) centrifuge bacteria (5000 rpm, 5 min), resuspend in PBS, adjust cultures to MacFarland 0.5 and transfer 50 ul of adjusted culture into 9950 ul CAMHB, mix by vortexing.
4. After 2-4 hrs (absorbance aprox. 0.3-0.5 at 600 nm) centrifuge bacteria (5000 rpm, 5 min), resuspend in PBS, adjust cultures to MacFarland 0.5 and transfer 50 ul of adjusted culture into 9950 ul of 1.1×CAMHB (cation adjusted Muller-Hinton Broth), mix by vortexing.
5. Mother plate preparation [one mother plate for 10 daughter plates, one daughter plate per strain]: (prepare while bacteria are growing, step 5): Add 200 ul of compound stocks to first wells of the deep well plate and 100 ul DMSO to all other wells. Do 2-fold serial dilutions of compounds in wells 2-11 (transfer 100 ul from 1 to 2, mix 4 times by pipetting, transfer 100 ul from 2 to 3, mix etc., discard 100 ul from well 11). Well 12 is control with DMSO only.

Add 900 ul of sterilized distilled water to each well, mix by pipetting.

6. MIC plate preparation: Transfer 10 ul from each well of mother plate to corresponding wells of daughter plates. Add 90 ul of bacterial inoculum to each well, mix by pipetting.
7. Incubate 24 hours at 37° C. and score for growth. Growth is considered either a turbid well, an obvious pellet, or >3 pinpoints of bacteria present in the well. The lowest concentration of compound to show no growth is scored as the MIC.

Vancomycin MICs for *Staphylococcus aureus* vary between 0.1 ug/ml and 10 ug/ml using the standard broth microdilution MIC assay. MICs of intact HCAbs for Staph. *aureus* vary between 0.025 ug/ml and 25 ug/ml. If variable region fragments or nanobodies are used the MIC for Staph. *aureus* varies between 0.008 ug/ml and 8 ug/ml.

(Vancomycin MIC of Staph. *Aureus*: 0.25-4 ug/ml, Vancomycin MIC of MRSA: 1-138 ug/ml, Mol. Weight Vancomycin is 1450 dalton, Mol. Weight of HCAb is 80,000 daltons, HCAb is ~50× heavier than Vancomycin, Affinity of Vancomycin for Lipid II is 50 nM, Affinity of HCAb will be between 0.5 to 10 nM. HCAbs will have MIC between 0.025 and 25 ug/ml).

(*J. Clin. Microbiol.* 2006, 44(11):3883. DOI: A. Bruckner Guiqing Wang, Janet F. Hindler, Kevin W. Ward and David. Increased Vancomycin MICs for *Staphylococcus aureus* Clinical Isolates from a University Hospital during a 5-Year Period)

MIC of HCAbs in the Presence of Immunoglobulins, Complement and Phagocytic Cells Opsonization phagocytic assays (OPA) are performed as described by U.S. Pat. No. 8,410,249. OPAs measure the kill of bacteria in the presence of antibody, complement, and phagocytic cells. Complement and cells of humans are commonly used. HCAbs or fragments are tested at concentrations between 0.01 ug/ml and 10 µg/ml. Killing of bacteria is measured by determining colony forming units before and after incubation with all the components. Opsonization is also visualized under the microscope. Either human polymorphonuclear leukocytes (PMNs) or differentiated HL60 promyelocytic leukemia (HL60) cells are used as effector cells. Complement in human serum or baby rabbit serum is used as a source for complement. In brief, HCAbs or other specimens are serially diluted in twofold steps in a 96-well microtiter plate with Hanks balanced salt solution and are then incubated with bacteria (~2,000 CFU per well) and complement for 30 min at 37° C. on an orbital shaker. The optimal shaking speed is determined for each bacterial strain to minimize nonspecific killing or overgrowth. Freshly isolated human PMNs or differentiated HL60 cells (effector cells) are added at a 400:1 ratio to the bacterium (target)-complement-serum mixture and the mixture is incubated at 37° C. for 45 min. OPA titer is the serum dilution that causes a 50% reduction of the CFU (killing) compared to the CFU from the control wells containing all reagents except HCAbs or fragments thereof. HCAbs kill bacteria between 10 ng/ml and 10 µg/ml.

Immunization with Cells

Method of immunization with cells are well known in the art. For example, for the expression of anti-CD3e antibodies, human Jurkat cells are grown in tissue culture. Expression of the desired human antibody is analyzed by incubation of Jurkat cells with monoclonal antibody OKT3. Subsequently, unbound OKT3 is removed by washing of the cells, and bound OKT3 is detected with anti-mouse IgG conjugated with fluoresceine and flow cytometric analysis.

Rat T cell hybridoma cells are transfected by electroporation with an eukaryotic expression plasmid encoding human CD3 as described (Transy et al., 1989, *Eur J Immunol* 19(5):947-50). Transfectants expressing human CD3 are enriched by FACS and propagated in tissue culture.

Genetically engineered rats expressing heavy chain only (HCO) antibodies, are immunized by injection of 30×10(6) Jurkat cells intraperitoneally. Four and eight weeks after the primary immunization rats are immunized with rat T cells expressing human CD3. Animals expressing anti-human CD3e heavy chain only antibodies are used for the isolation of monoclonal heavy chain only anti-CD3e antibodies DNA-Based Immunization Protocols Gene vaccines, or the use of antigen-encoding DNAs to immunize, represent an alternative approach to the development of strong antibody responses in rats.

The route of DNA inoculation is in general the skin, muscle and any other route that supports transfection and expression of the antigen. Purified plasmid DNAs that have been designed to express antigens such an influenza virus hemagglutinin glycoprotein or other human or viral antigens are used. Routes of DNA inoculation include the following: intravenous (tail vein), intraperitoneal; intramuscular (both quadriceps), intranasal, intradermal (such as foot pad), and subcutaneous (such as scruff of the neck). In general, 10-100 µg of DNA is administered in 100 µl of saline per inoculation site or DNA is administered with appropriate vehicles such as gold particles or certain formulations (http://www.incellart.com/index.php?page=genetic-immunization&menu=3.3) that facilitate uptake and transfection of cells. The immunization scheme is similar to the protocol described above; primary immunization followed by booster immunizations.

Purification of Heavy Chain Only Antibodies

For the purification of antibodies, blood is collected from immunized rats and serum or plasma is obtained by centrifugation, which separates the coagulated cell pellet from the liquid top phase containing serum antibodies. Antibodies from serum of plasma are purified by standard procedures. Such procedures include precipitation, ion exchange chromatography, and/or affinity chromatography. For the purification of IgG protein A or poteen G can be used (Brüggemann et al., JI, 142, 3145, 1989).

Example 3: Isolation of Antibody Expressing B Cells from Rats

Isolation of B Cells from Spleen, Lymph Nodes or Peripheral Blood

A single-cell suspension is prepared from the spleen or lymph nodes of an immunized rat. Cells can be used without further enrichment, after removal of erythrocytes or after the isolation of B cells, memory B cells, antigen-specific B cells or plasma cells. Enrichment can lead to better results and as a minimum removal of erythrocytes is recommended. Memory B cells are isolated by depletion of unwanted cells and subsequent positive selection. Unwanted cells, for example, T cells, NK cells, monocytes, dendritic cells, granulocytes, platelets, and erythroid cells are depleted using a cocktail of antibodies against CD2, CD14, CD16, CD23, CD36, CD43, and CD235a (Glycophorin A). Positive selection with antibodies specific for IgG or CD19 results in highly enriched B cells (between 50%-95%). Antigen-specific B cells are obtained by exposing cells to antigen(s) tagged with fluorescent markers and/or magnetic beads. Subsequently, cells tagged with fluorochrome and/or magnetic beads are separated using (flow cytometry or a fluorescence activated cell sorter [FACS]) a FACS sorter and/or magnets. As plasma cells may express little surface Ig, intracellular staining may be applied.

Isolation of B Cells by Fluorescence Activated Cell Sorting

FACS-based methods are used to separate cells by their individual properties. It is important that cells are in a single-cell suspension. Single cell suspensions prepared from peripheral blood, spleen or other immune organs of immunized rats are mixed with fluorochrome-tagged antibodies specific for B cell markers such as CD19, CD138, CD27 or IgG. Alternatively, cells are incubated with fluorochrome-tagged antigens. The cell concentration is between 1-20 million cells/ml in an appropriate buffer such as PBS. For example, memory B cells can be isolated by selecting cells positive for CD27 and negative for CD45R. Plasma cells can be isolated by selecting for cells positive for CD138 and negative for CD45R. Cells are loaded onto the FACS machine and gated cells are deposited into 96 well plates or tubes containing media. If necessary positive controls for each fluorochrome are used in the experiment, which allows background subtraction to calculate the compensation.

Isolation of B Cells from Bone Marrow

Bone marrow plasma cells (BMPCs) are isolated from immunized animals as described (Reddy et al., 2010, *Nature Biotechnology* 28, 965-969). Muscle and fat tissue are removed from the harvested tibias and femurs. The ends of both tibias and femurs are clipped with surgical scissors and bone marrow is flushed out with a 26-gauge insulin syringe (Becton Dickinson, BD). Bone marrow is collected in sterile-filtered buffer no. 1 (PBS, 0.1% BSA, 2 mM EDTA). Bone marrow cells are collected by filtration through a cell strainer (BD) with mechanical disruption and washed with 20 ml PBS and collected in a 50 ml tube (Falcon, BD). Bone marrow cells are centrifuged at 335 g for 10 min at 4° C. Supernatant is decanted and the cell pellet is resuspended in 3 ml of red cell lysis buffer (eBioscience) and shaken gently at 25° C. for 5 min. Cell suspension is diluted with 20 ml of PBS and centrifuged at 335 g for 10 min at 4° C. Supernatant is decanted and cell pellet resuspended in 1 ml of buffer no. 1

Bone marrow cell suspensions are incubated with biotinylated anti-CD45R and anti-CD49b antibodies. The cell suspension is then rotated at 4° C. for 20 min. This is followed by centrifugation at 930 g for 6 min at 4° C., removal of supernatant and re-suspension of the cell pellet in 1.5 ml of buffer no. 1. Streptavidin conjugated M28 magnetic beads (Invitrogen) are washed and resuspended according to the manufacturer's protocol. Magnetic beads (50 ul) are added to each cell suspension and the mixture is rotated at 4° C. for 20 min. The cell suspensions are then placed on Dynabead magnets (Invitrogen) and supernatant (negative fraction, cells unconjugated to beads) are collected and cells bound to beads are discarded.

Prewashed streptavidin M280 magnetic beads are incubated for 30 min at 4° C. with biotinylated anti-CD138 with 0.75 ug antibody per 25 ul of magnetic beads mixture. Beads are then washed according to the manufacturer's protocol and resuspended in buffer no. 1. The negative cell fraction (depleted of CD45R+ and CD49b+ cells) collected as above is incubated with 50 ul of CD138-conjugated magnetic beads and the suspension is rotated at 4° C. for 30 min. Beads with CD138+ bound cells are isolated by the magnet, washed 3 times with buffer no. 1, and the negative (CD138−)

cells unbound to beads are discarded. The positive CD138+ bead-bound cells are collected and stored at 4° C. until further processed.

Alternatively, the method described in Ouisse et al., BMC Biotechnology, 2017, 17:3, 1-17 can be used.

Example 4: Generation of Hybridomas

Isolated B cells are immortalized by fusion with myeloma cells such as X63 or YB2/0 cells as described (Köhler and Milstein, Nature, 256, 495, 1975). Hybridoma cells are cultured in selective media and antibody producing hybridoma cells are generated by limiting dilution or single cell sorting.

Example 5: Isolation of cDNAs Encoding Heavy Chain Only Antibodies

Generation of cDNA Sequences from Isolated Cells

Isolated cells are centrifuged at 930 g at 4° C. for 5 min. Cells are lysed with TRI reagent and total RNA is isolated according to the manufacturer's protocol in the Ribopure RNA isolation kit (Ambion). mRNA is isolated from total RNA with oligo dT resin and the Poly(A) purist kit (Ambion) according to the manufacturer's protocol. mRNA concentration is measured with an ND-1000 spectrophotometer (Nanodrop).

The isolated mRNA is used for first-strand cDNA synthesis by reverse transcription with the Maloney murine leukemia virus reverse transcriptase (MMLV-RT, Ambion). cDNA synthesis is performed by RT-PCR priming using 50 ng of mRNA template and oligo dT-primers according to the manufacturer's protocol of Retroscript (Ambion). After cDNA construction, PCR amplification is performed to amplify heavy chain only antibodies. A list of primers is shown in Table 1:

TABLE 1

Discloses SEQ ID NOS 27-39, respectively, in order of appearance

| Human VH Gene | Oligo Sequence | VH Gene Matches |
|---|---|---|
| VH1 | ATGGACTGGACCTGGAGGATCC | 1-02, 1-03, 1-08, 7-04.1 |
| VH1-24 | ATGGACTGCACCTGGAGGATCC | 1-24 |
| VH2 | TCCACGCTCCTGCTGCTGAC | 2-05 |
| VH2-26 | GCTACACACTCCTGCTGCTGACC | 2-26 |
| VH3 | ATGGAGTTTGGGCTGAGCTGG | 3-11, 3-23, 3-30, 3-33 |
| VH3-07 | ATGGAATTGGGGCTGAGCTG | 3-07 |
| VH3-09 | ATGGAGTTGGGACTGAGCTGGA | 3-09 |
| VH3-35 | ATGGAATTTGGCCTGAGCTGG | 3-35 |
| VH3-38 | ATGCAGTTTGTGCTGAGCTGG | 3-38 |
| VH4 | TGAAACACCTGTGGTTCTTCC | 4-04, 4-28, 4-31, 4-34 |
| VH4-39 | TGAAGCACCTGTGGTTCTTCC | 4-39 |
| VH6 | TCATCTTCCTGCCCGTGCTGG | 6-01 |

TABLE 1-continued

Discloses SEQ ID NOS 27-39, respectively, in order of appearance

| Human VH Gene | Oligo Sequence | VH Gene Matches |
|---|---|---|
| Rat IgM CH2 | GCTTTCAGTGATGGTCAGTGTGC TTATGAC | |

A 50 μl PCR reaction consists of 0.2 mM forward and reverse primer mixes, 5 ul of Thermopol buffer (NEB), 2 ul of unpurified cDNA, 1 ul of Taq DNA polymerase (NEB) and 39 ul of double-distilled H₂O. The PCR thermocycle program is 92° C. for 3 min; 4 cycles (92° C. for 1 min, 50° C. for 1 min, 72° C. for 1 min); 4 cycles (92° C. for 1 min, 55° C. for 1 min, 72° C. for 1 min), 20 cycles (92° C. for 1 min, 63° C. for 1 min, 72° C. for 1 min); 72° C. for 7 min, 4° C. storage. PCR gene products are gel purified and DNA sequenced.

Example 6: Cloning and Expression of Recombinant Heavy Chain-Only Antibodies

PCR products are subcloned into a plasmid vector. For expression in eukaryotic cells cDNA encoding heavy chain only antibody are cloned into an expression vector as described (Tiller et al., 2008; 329(1-2):112-124).

Alternatively, the genes encoding heavy chain only antibodies are cloned into a minicircle producing plasmid as described (Kay et al., 2010; *Nature Biotechnology* 28.12 (2010): 1287-1289).

Alternatively, genes encoding heavy chain only antibodies are synthesized from overlapping oligonucleotides using a modified thermodynamically balanced inside-out nucleation PCR (Gao at al., 2003; *Nucleic Acids Research*; 31(22):e143) and cloned into an eukaryotic expression vector.

Alternatively, genes encoding heavy chain-only antibodies are synthesized and cloned into a plasmid.

For the assembly of multiple expression cassettes encoding various heavy chain only antibodies in an artificial chromosome, multiple expression cassettes are ligated with each other and subsequently cloned into a BAC vector, which is propagated in bacteria. For transfection ElectroMAX™ DH10B™ cells from Invitrogen are used (http://tools.invitrogen.com/content/sfs/manuals/18290015.pdf).

Alternatively, ligated expression cassettes are further ligated with yeast artificial chromosome arms, which are propagated in yeast cells (Davies et al., 1996, supra).

Plasmid Purification

GenElute™ plasmid miniprep kits from Sigma-Aldrich are used for plasmid isolation from ~5 ml (or larger) overnight bacterial culture (http://www.sigmaaldrich.com/life-science/molecular-biology/dna-and-rna-purification/plasmid-miniprep-kit.html). This involves harvesting bacterial cells by centrifugation followed by alkaline lysis. DNA is then column-bound, washed and eluted and ready for digests or sequencing.

BAC Purification

NucleoBond$^R$ BAC100 from Clontech is a kit designed for BAC purification (http://www.clontech.com/products/detail.asp?tabno=2&product_id=186802). For this bacteria are harvested from 200 ml culture and lysed by using a modified alkaline/SDS procedure. The bacterial lysate is cleared by filtration and loaded onto the equilibrated column, where plasmid DNA binds to the anion exchange resin. After subsequent washing steps, the purified plasmid DNA is eluted in a high-salt buffer and precipitated with isopropanol. The plasmid DNA is reconstituted in TE buffer for further use.

YAC Purification

Linear YACs, circular YACs and BAC fragments after digests, are purified by electro-elution using Elutrap™ (Schleicher and Schuell) (Gu et al., 1992, supra) from strips cut from 0.8% agarose gels run conventionally or from pulsed-field-gel electrophoresis (PFGE). The purified DNA is precipitated and re-dissolved in buffer to the desired concentration.

The purification of circular YACs from yeast is carried out using Nucleobond AX silica-based anion-exchange resin (Macherey-Nagel, Germany). Briefly, spheroplasts are made using zymolyase or lyticase and pelleted (Davies et al., 1996, supra). The cells then undergo alkaline lysis, binding to AX100 column and elution as described in the Nucleobond method for a low-copy plasmid. Contaminating yeast chromosomal DNA is hydrolyzed using Plasmid-Safe™ ATP-Dependent DNase (Epicentre Biotechnologies) followed by a final cleanup step using SureClean (Bioline). An aliquot of DH10 electrocompetent cells (Invitrogen) is then transformed with the circular YAC to obtain BAC colonies (see above). For the separation of the insert DNA, 150-200 kb, from BAC vector DNA, ~10 kb, a filtration step with Sepharose 4B-CL is used (Yang et al., supra).

Transfection of Cells with Plasmid or BAC DNA

For the expression of recombinant heavy chain only antibodies, eukaryotic cells are transfected as described (Andreason and Evans, 1989, Anal. Biochem. 180(2):269-75; Baker and Cotten, 1997, Nucleic Acid Res., 25(10):1950-6; http://www.millipore.com/cellbiology/cb3/mammalian-cell). Cells expressing heavy chain only antibodies are isolated using various selection methods. Limiting dilution or cell sorting is used for the isolation of single cells. Clones are analyzed for heavy chain only antibody expression.

Example 7: J Gene Usage in UniRat™ and OmniFlic™

FIG. 1 shows the human transgene used in UniRat™ to express heavy chain-only antibodies, as described in the previous Examples. OmniFlic™ uses the same human V gene cluster as UniRat but expresses a fixed κ light chain.

Figure 2:
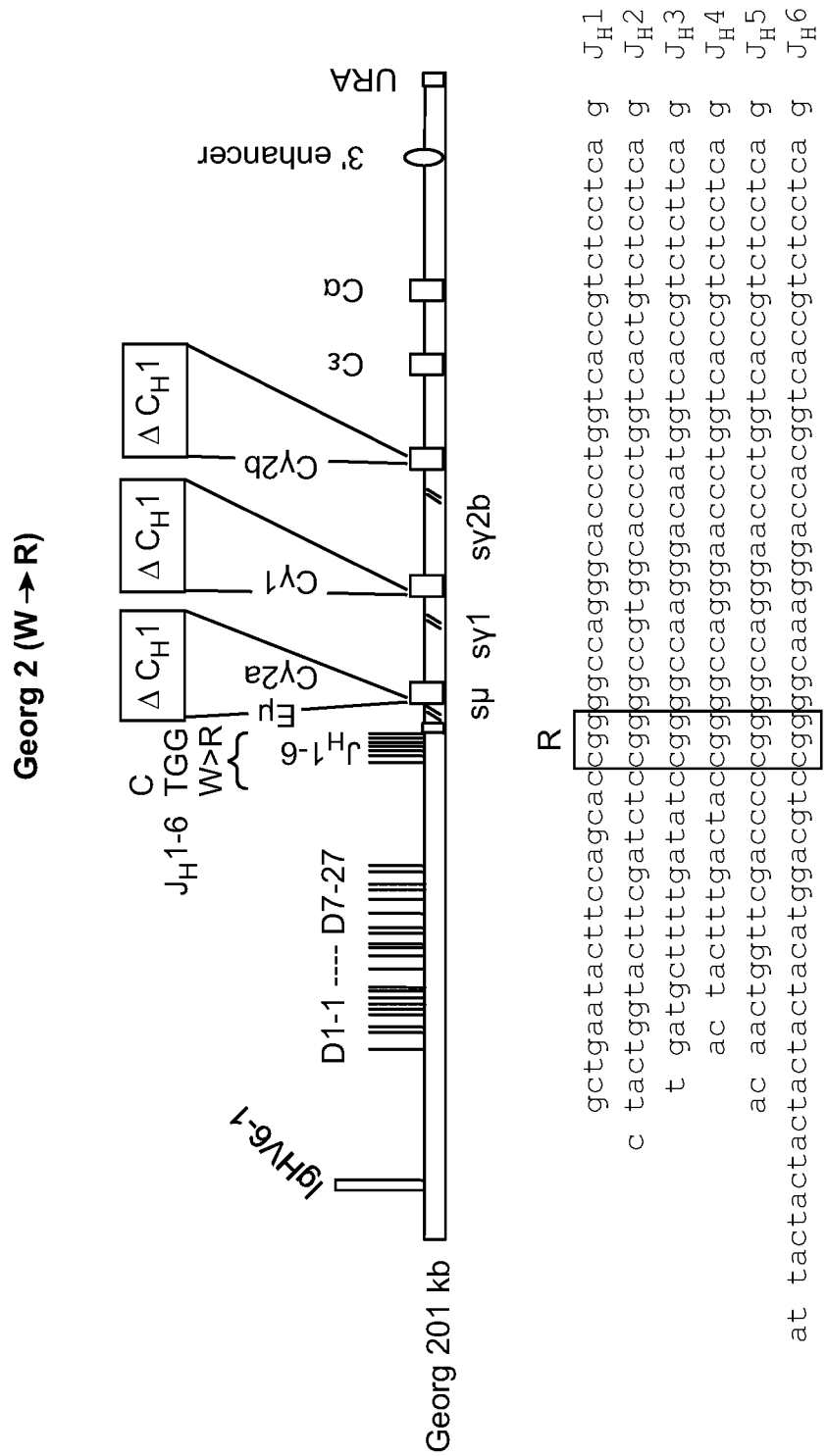
FIG. 2 is a diagram of the human transgene with all J segments (SEQ ID NOS 42-47, respectively, in order of appearance) expressing Rs at position 101 in UniRat™ that express heavy chain-only antibodies, as described in the examples.

FIG. 2 shows the human transgene used in UniRat™ to express heavy chain-only antibodies with all J genes expressing an Arginine at position 101, as described in the previous Examples.

Figure 3:
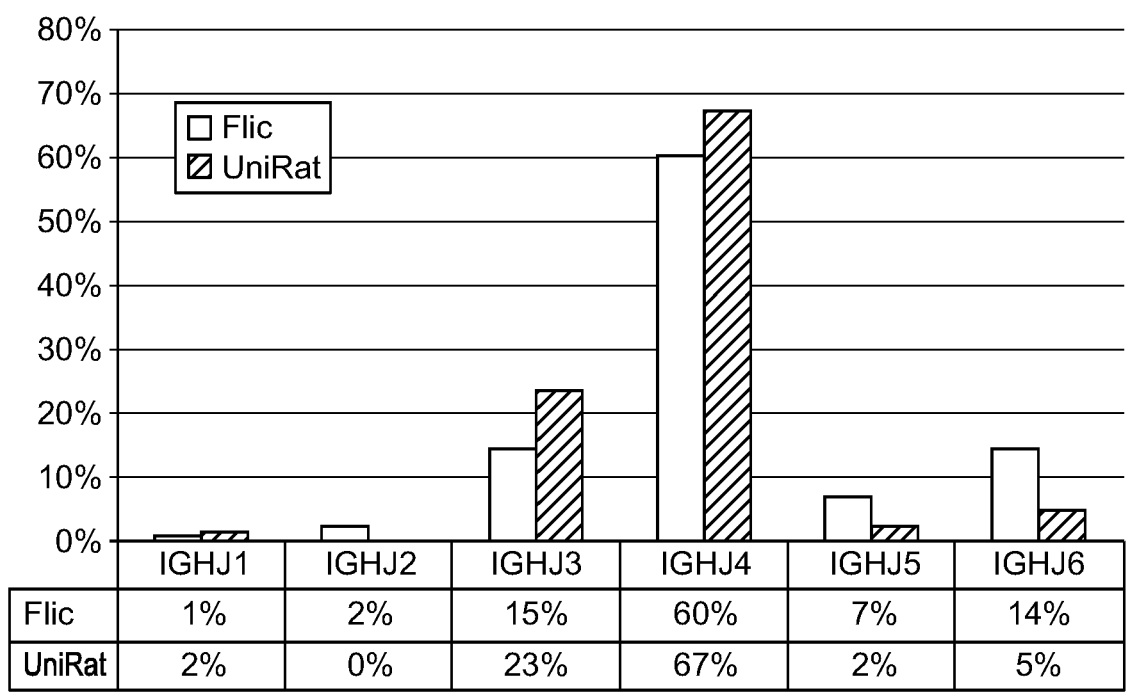
FIG. 3 shows the J gene usage in UniRat™ and Omni-Flic™, where the latter is a transgenic rat with the same human V gene cluster as UniRat™ but expresses a fixed kappa light chains.

The expressed antibody repertoire of UniRat™ and OmniFlic™ was determined by next-generation sequencing of the full VH region from mRNA isolated from lymph-node derived B cells from immunized animals. Full VH sequences from expressed antibodies were aligned to the human IGHV and IGHJ germline sequences. The frequency of J gene usage was calculated from at least 6 independent UniRat™ and OmniFlic™ animals. FIG. 3 shows that UniRat™ uses IGHJ4 containing the W101R mutation at a higher frequency than OmniFlic™ that has the wild type IGHJ4 sequence. OmniFlic™ also uses IGHJ6 at a much higher frequency than UniRat.™

Example 8: W101 Mutation Inhibits λ Association

Figure 4:
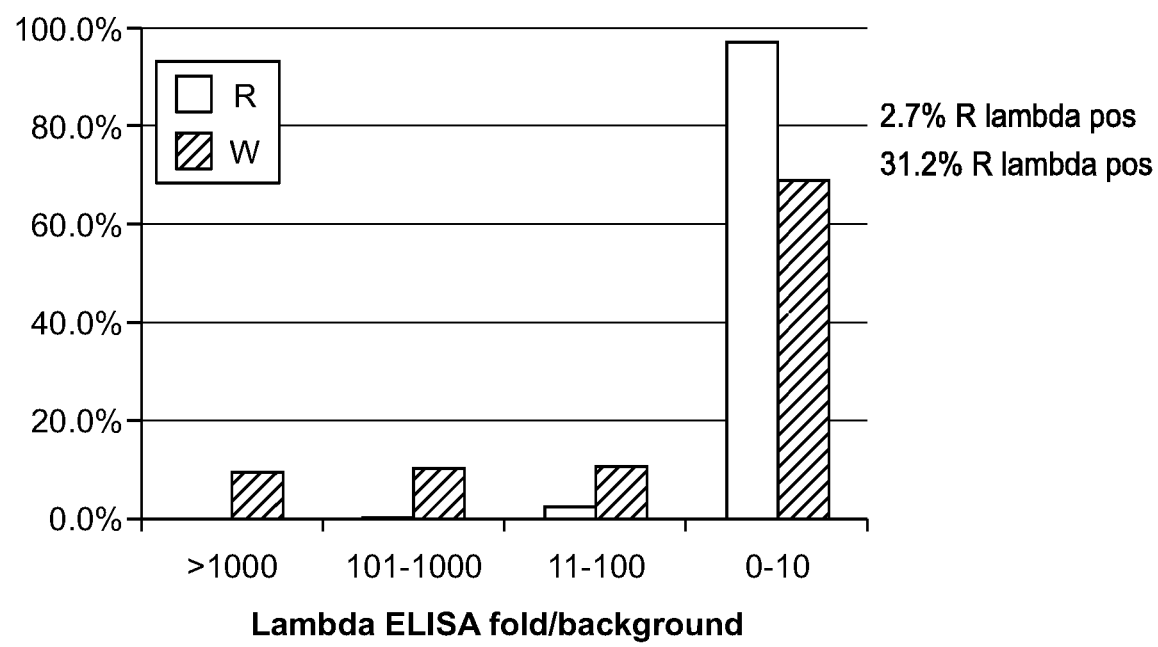
FIG. 4 illustrates that a W→R mutation at the first amino acid residue of the fourth framework region (FR4) in heavy chain-only human antibodies inhibits association with lambda light chain.

Lambda association to a large collection of 1058 heavy chain antibodies was measured by standard ELISA. Of the 1058 total heavy chain antibodies, 859 contained an R at position 101, and 199 contained a W at position 101. FIG. 4 shows that only 2.7% of the R101 heavy chain antibodies showed a significant association with free lambda protein, determined as an ELISA signal of 10-fold or greater over background signal. In contrast, 31.2% of the W101 heavy chain antibodies showed a significant association with free lambda protein using the same criteria. These results indicate that the W101R mutation is highly protective against lambda association, and that W101 heavy chain antibodies have a much higher likelihood of associating with lambda than R101.

Example 9: Free λ Protein Association with Heavy Chain-Only Antibodies in the Same CDR3 Family FIG. 5 shows a multiple sequence alignment of 11 VH sequences from heavy chain antibodies in the same CDR3 family. All of these sequences contain a W at position 101. The top 7 sequences in the alignment were all positive for lambda association measured by ELISA. The bottom 4 sequences in the alignment were all negative for lambda association also measured by ELISA. This family of VH sequences shows additional mutations at positions a and b that discriminate between the lambda positive and negative sequences. A Ser or Glu at either position a or b eliminates lambda association. However, Ser or Glu at these positions in other CDR3 families did not have the same association with lambda binding. Results from this family suggest that there are compensatory mutations in W101 VH sequences that prevent lambda association, but that these compensatory mutations are specific to a CDR3 family.

Example 10: D-J Junction Diversity is Different Between UniRat™ and OmniFlic™ when IGHJ6 is Used As shown in Example 6, IGHJ6 is used 3 times more frequently in OmniFlic™ compared to UniRat™ Furthermore, as shown in FIG. 3, when IGHJ6 is used in UniRat™, the stretch of 5 Tyr residues seen in the germline IGHJ6 sequence is shortened to 1 Tyr most frequently. In contrast, a stretch of 4 Tyr residues is the most common length in OmniFlic™ when IGHJ6 is used. This suggests that there is selective pressure to shorten the stretch of 5 Tyr residues present in the germline IGHJ6 sequence in heavy chain antibodies containing W101 when IGHJ6 is used.

Example 11: Chimeric Antigen Receptor Using a Human VH Extracellular Binding Domain Expressing a chimeric antigen receptor on a primary T cell requires expressing a single chimeric protein that contains an extracellular antigen binding domain and an intracellular signaling domain. Single chain Fv fragments are typically used as the antigen binding domain. An example of an scFv chimeric antigen receptor is shown in panel A of FIG. 6. Alternatively, a single human VH binding domain is used as the extracellular binding domain (panel B or FIG. 6). Using a single human VH has the advantage of being a smaller and less complex protein to express and is less immunogenic.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A recombinant heavy chain-only immunoglobulin (Ig) locus comprising:
   (i) one or more human V gene segments, one or more human D gene segments, and one or more human J gene segments, which when recombined with each other in the genome of a non-human animal, and following affinity maturation, encode a heavy chain variable (VH) region comprising complementarity determining regions (CDRs) and framework (FR) regions, wherein at least one of said human J segments comprises a codon encoding a different amino acid residue at the first position of the fourth framework region (FR4) that is capable of disrupting a surface-exposed hydrophobic patch comprising or associated with the native amino acid residue at that position; and
   (ii) a plurality of C region gene segments that together encode a constant effector region that:
   (a) lacks a Cμ coding region;
   (b) comprises a Cγ coding region, which comprises a Cγ2a coding region, a Cγ1 coding region, and a Cγ2b coding region, wherein each of the Cγ2a, Cγ1 and Cγ2b coding regions lacks a CH1 exon;
   (c) comprises a Cε coding region that comprises a CH1 exon; and
   (d) comprises a Cα coding region that comprises a CH1 exon.

2. The recombinant heavy chain-only Ig locus of claim 1, comprising two to 40 D gene segments, and two to 20 J gene segments.

3. The recombinant heavy chain-only Ig locus of claim 2, wherein more than one of said human J segments comprise a codon encoding a different amino acid residue at the first position of the fourth framework region (FR4) that is capable of disrupting a surface-exposed hydrophobic patch comprising or associated with the native amino acid residue at that position.

4. The recombinant heavy chain-only Ig locus of claim 3, wherein all of said human J segments comprise a codon encoding a different amino acid residue at the first position of the fourth framework region (FR4) that is capable of disrupting a surface-exposed hydrophobic patch comprising or associated with the native amino acid residue at that position.

5. The recombinant heavy chain-only Ig locus of claim 4, wherein in the encoded VH region the native amino acid residue at the first position of FR4 is substituted by a polar amino acid residue.

6. The recombinant heavy chain-only Ig locus of claim 5, wherein in the encoded VH region the native amino acid residue at the first position of FR4 is substituted by a positively charged amino acid residue.

7. The recombinant heavy chain-only Ig locus of claim 6, wherein in the encoded VH region the positively charged amino acid residue is arginine (R).

8. The recombinant heavy chain-only Ig locus of claim 7, wherein the encoded VH region comprises a tryptophan (W) to arginine (R) substitution at the first amino acid residue in the fourth framework (FR4) region.

9. The recombinant heavy chain-only Ig locus of claim 8 comprising a J4 gene segment in which the codon for W is replaced by R.

10. The recombinant heavy chain-only Ig locus of claim 1, wherein the encoded VH region comprises one or more further mutations in one or more framework regions.

11. The recombinant heavy chain-only Ig locus of claim 1, encoding a human or humanized heavy chain-only antibody comprising said VH region.

12. A transgenic non-human animal comprising a recombinant heavy chain-only Ig locus of claim 1.

13. A transgenic non-human animal that does not express any functional immunoglobulin light chain genes and comprises a heterologous heavy chain-only Ig locus comprising one or more V gene segments, one or more D gene segments, and one or more J gene segments, which when recombined with each other and following affinity maturation encode a VH domain comprising complementarity determining regions (CDRs) and framework regions (FRs), in which the native amino acid residue at the first position of the fourth framework region (FR4) of said VH domain is substituted by a different amino acid residue that is capable of disrupting a surface-exposed hydrophobic patch comprising or associated with the native amino acid residue at that position, and a plurality of constant region gene segments, that together encode an antibody constant effector region that:
  (a) lacks a Cμ coding region;
  (b) comprises a Cγ coding region, which comprises a Cγ2a coding region, a Cγ1 coding region, and a Cγ2b coding region, wherein each of the Cγ2a, Cγ1 and Cγ2b coding regions lacks a CH1 exon;
  (c) comprises a Cε coding region that comprises a CH1 exon; and
  (d) comprises a Cα coding region that comprises a CH1 exon;
  wherein the gene segments are arranged such that a V, a D and a J gene segment and the constant region gene segments recombine to produce a rearranged affinity matured heavy chain-only gene locus encoding a heavy chain-only antibody (HCAb).

14. The recombinant heavy chain-only Ig locus of claim 6, wherein in the encoded VH region, the positively charged amino acid residue is selected from the group consisting of lysine (K), arginine (R) and histidine (H).

* * * * *

```
                          SEQUENCE LISTING

<160> NUMBER OF SEQ ID NOS: 58

<210> SEQ ID NO 1
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 1
gtattacaca caaaatggga aaagctg                                          27

<210> SEQ ID NO 2
<211> LENGTH: 32
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 2
ccggtagtca aagtagtcac attgtgggag gc                                    32

<210> SEQ ID NO 3
<211> LENGTH: 64
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 3
ccttaatggg gcctcccaca atgtgactac tttgactacc ggggccaggg aaccctggtc      60
accg                                                                   64

<210> SEQ ID NO 4
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 4
gaatcctagg attgccttct tagcctg                                          27

<210> SEQ ID NO 5
<211> LENGTH: 176
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 5
ccatagacca aacttaccta ctatctagtc ctgccaacct taagagcagc aacatggaga      60
```

```
cagcagagtg tagagagatc tcctgactgg caggaggcaa gaagatggat tcttactcgt    120
ccatttctct tttatccctc tctggtccta gagaacaacc aggggatgag gggctc        176
```

<210> SEQ ID NO 6
<211> LENGTH: 208
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 6

```
gcacaagtgg acaaagtctt tggccagtct agaaagaagc ccgtctcaga gatcaaagct    60
ggagggcaac acaggaaaga tgtgggaata agtttactag tcatacaggc aggaaccca    120 ggcccagagg tagtgtccct gtgggagggt ctcttgctct ctgatgtcct tccatgctga   180
gagttagggc ccttgtccaa tcatgttc                                       208
```

<210> SEQ ID NO 7
<211> LENGTH: 71
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 7

```
gaattttgcc caagtttttt cagcttttcc cattttgtgt gtaatacgta cacaccgcag    60
ggtaataact g                                                         71
```

<210> SEQ ID NO 8
<211> LENGTH: 74
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 8

```
gacgggcttc tttctagact ggccaaagac tttgtccact tgtgcgcagt tatctatgct    60
gtctcaccat agag                                                      74
```

<210> SEQ ID NO 9
<211> LENGTH: 26
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 9

```
ggaggtctag gctggagctg atccag                                         26
```

<210> SEQ ID NO 10
<211> LENGTH: 51
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 10
cctcgtcccc tggttgttct ctcaagaaaa agtatgcgtg atcattttgt c        51

<210> SEQ ID NO 11
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 11
agagaacaac caggggacga gg                                         22

<210> SEQ ID NO 12
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 12
gtccacatag tcctccagag agagaag                                    27

<210> SEQ ID NO 13
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 13
gacccaagtc cagttcccaa caaccac                                    27

<210> SEQ ID NO 14
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 14
cctcgtcccc tggttgtcct ctcaagagag gagggagtgt gagcttttcc           50

<210> SEQ ID NO 15

<400> SEQUENCE: 15

000

<210> SEQ ID NO 16
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 16
agaggacaac cagggacga ggggctc        27

<210> SEQ ID NO 17
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 17
gcatggggaa ggggcattgt atgtagg        27

<210> SEQ ID NO 18
<211> LENGTH: 26
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 18
cagatcacac tgtctgctca cttcac        26

<210> SEQ ID NO 19
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 19
aaggcagcag gatggaagct gatgtcg        27

<210> SEQ ID NO 20
<211> LENGTH: 124
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 20
gctggagggc aacacaggaa agatgtggga ataagtttac tagtcataca ggcaggaacc        60
ccaggcccag aggtagtgtc cctgtgggag ggtctcttgc gcacacaccg cagggtaata        120
actg        124

<210> SEQ ID NO 21
<211> LENGTH: 91
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 21
gatttaaatg tcaattggtg agtcttctgg ggcttcctac atacaatgcc ccttccccat        60
gcgcagttat ctatgctgtc tcaccataga g        91

<210> SEQ ID NO 22
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 22
atgagcagca ccctctcgtt gaccaaggct gactatgaa                    39

<210> SEQ ID NO 23
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 23
caggtgtgcc catccagctg agttaaggtg gag                          33

<210> SEQ ID NO 24
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 24
caggaccagg acacctgcag cagctggcag gaagcaggt                    39

<210> SEQ ID NO 25
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 25
aacagccatt tgcagaccaa agggaaggaa aga                          33

<210> SEQ ID NO 26
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 26
ttctaccctg gtgttatgac agtggtctgg aaggcagatg gt                42

<210> SEQ ID NO 27
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

```
<400> SEQUENCE: 27
atggactgga cctggaggat cc                                            22

<210> SEQ ID NO 28
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 28
atggactgca cctggaggat cc                                            22

<210> SEQ ID NO 29
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 29
tccacgctcc tgctgctgac                                               20

<210> SEQ ID NO 30
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 30
gctacacact cctgctgctg acc                                           23

<210> SEQ ID NO 31
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 31
atggagtttg ggctgagctg g                                             21

<210> SEQ ID NO 32
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 32
atggaattgg ggctgagctg                                               20

<210> SEQ ID NO 33
<211> LENGTH: 22
<212> TYPE: DNA
```

-continued

```
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 33
atggagttgg gactgagctg ga                                           22

<210> SEQ ID NO 34
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 34
atggaatttg gcctgagctg g                                            21

<210> SEQ ID NO 35
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 35
atgcagtttg tgctgagctg g                                            21

<210> SEQ ID NO 36
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 36
tgaaacacct gtggttcttc c                                            21

<210> SEQ ID NO 37
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 37
tgaagcacct gtggttcttc c                                            21

<210> SEQ ID NO 38
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 38
tcatcttcct gcccgtgctg g                                            21
```

<210> SEQ ID NO 39
<211> LENGTH: 30
<212> TYPE: DNA
<213> ORGANISM: Artificial Sequence
<220> FEATURE:
<221> NAME/KEY: source
<223> OTHER INFORMATION: /note="Description of Artificial Sequence: Synthetic primer"

<400> SEQUENCE: 39
gctttcagtg atggtcagtg tgcttatgac                                     30

<210> SEQ ID NO 40
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence: Synthetic oligonucleotide"

<400> SEQUENCE: 40
actactttga ctacyggggc cagggaaccc tggtcaccgt ctcctcag                 48

<210> SEQ ID NO 41
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"
<220> FEATURE:
<221> NAME/KEY: VARIANT
<222> LOCATION: (5)..(5)
<223> OTHER INFORMATION: /replace="Arg"
<220> FEATURE:
<221> NAME/KEY: MISC_FEATURE
<222> LOCATION: (5)..(5)
<223> OTHER INFORMATION: /note="Residue given in the sequence has no preference with respect to that in the annotations for said position"

<400> SEQUENCE: 41

Tyr Phe Asp Tyr Trp Gly Gln Gly Thr Leu Val Thr Val Ser Ser
1               5                   10                  15

<210> SEQ ID NO 42
<211> LENGTH: 52
<212> TYPE: DNA
<213> ORGANISM: Artificial Sequence
<220> FEATURE:
<221> NAME/KEY: source
<223> OTHER INFORMATION: /note="Description of Artificial Sequence: Synthetic oligonucleotide"

<400> SEQUENCE: 42
gctgaatact tccagcaccg gggccagggc accctggtca ccgtctcctc ag            52

<210> SEQ ID NO 43
<211> LENGTH: 53
<212> TYPE: DNA
<213> ORGANISM: Artificial Sequence
<220> FEATURE:
<221> NAME/KEY: source
<223> OTHER INFORMATION: /note="Description of Artificial Sequence: Synthetic oligonucleotide"

<400> SEQUENCE: 43
ctactggtac ttcgatctcc ggggccgtgg caccctggtc actgtctcct cag        53

<210> SEQ ID NO 44
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 44
tgatgctttt gatatccggg gccaagggac aatggtcacc gtctcttcag             50

<210> SEQ ID NO 45
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 45
actactttga ctaccggggc cagggaaccc tggtcaccgt ctcctcag               48

<210> SEQ ID NO 46
<211> LENGTH: 51
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 46
acaactggtt cgaccccggg ggccagggaa ccctggtcac cgtctcctca g           51

<210> SEQ ID NO 47
<211> LENGTH: 63
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 47
attactacta ctactactac atggacgtcc ggggcaaagg gaccacggtc accgtctcct  60
cag                                                               63

<210> SEQ ID NO 48
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 48

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
            35                  40                  45

Ser Thr Val Ser Gly Thr Gly Gly Ser Thr Tyr Tyr Ala Asp Ser Val
 50                      55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
            85                  90                  95

Ala Lys Asp Arg Phe Gly Thr Gly Thr Asn Phe Asp Tyr Trp Gly Gln
            100                 105                 110

Gly Thr Leu Val Thr Val Ser Ser
            115                 120

<210> SEQ ID NO 49
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 49

Glu Val Gln Leu Leu Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
            35                  40                  45

Ser Ala Ile Ser Gly Ser Gly Gly Ser Thr Tyr Tyr Ala Asp Ser Val
 50                      55                  60

Lys Gly Arg Phe Thr Ile Ser Arg Asp Asn Ser Lys Asn Arg Leu Tyr
 65                  70                  75                  80

Leu Gln Met Asn Ser Leu Arg Ala Glu Asp Thr Ala Val Tyr Tyr Cys
            85                  90                  95

Ala Lys Asp Arg Phe Gly Ser Gly Thr Asn Phe Asp Tyr Trp Gly Gln
            100                 105                 110

Gly Thr Leu Val Thr Val Ser Ser
            115                 120

<210> SEQ ID NO 50
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 50

Glu Val Gln Leu Leu Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
            35                  40                  45

Ser Thr Val Ser Gly Ser Gly Gly Ser Thr Tyr Tyr Ala Asp Ser Val
 50                      55                  60

Lys Gly Arg Phe Thr Ile Ser Arg Asp Asn Ser Lys Asn Thr Leu Tyr

```
                65                  70                  75                  80
Leu Gln Met Asn Ser Leu Arg Ala Glu Asp Thr Ala Val Tyr Tyr Cys
                    85                  90                  95

Ala Lys Asp Lys Trp Gly Thr Gly Thr Asn Phe Asp Tyr Trp Gly Gln
            100                 105                 110

Gly Thr Leu Val Thr Val Ser Ser
        115                 120

<210> SEQ ID NO 51
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 51

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Thr Val Ser Gly Thr Gly Gly Ser Thr Tyr Tyr Ala Asp Ser Val
    50                  55                  60

Gln Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Asp Arg Phe Gly Thr Gly Thr Asn Phe Asp Tyr Trp Gly Gln
            100                 105                 110

Gly Thr Leu Val Thr Val Ser Ser
        115                 120

<210> SEQ ID NO 52
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 52

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Ser
65                  70                  75                  80

Leu Gln Met Asn Ser Leu Arg Ala Glu Asp Thr Ala Val Tyr Phe Cys
                85                  90                  95

Ala Lys Asp Arg Phe Gly Thr Gly Thr Asn Phe Asp Tyr Trp Gly Gln
            100                 105                 110
```

Gly Thr Leu Val Thr Val Ser Ser
            115                 120

<210> SEQ ID NO 53
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 53

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Ala Met Ser Trp Val Arg Gln Ala Pro Gly Lys Gly Leu Glu Trp Val
        35                  40                  45

Ser Ala Val Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Ser
65                  70                  75                  80

Leu Gln Met Asn Ser Leu Arg Ala Glu Asp Thr Ala Val Tyr Phe Cys
                85                  90                  95

Ala Lys Asp Arg Phe Gly Thr Gly Thr Asn Phe Asp Tyr Trp Gly Gln
            100                 105                 110

Gly Thr Leu Val Thr Val Ser Ser
            115                 120

<210> SEQ ID NO 54
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 54

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Ala Met Ser Trp Val Arg Gln Ala Pro Gly Lys Gly Leu Glu Trp Val
        35                  40                  45

Ser Thr Val Ser Gly Thr Gly Gly Ser Thr Tyr Tyr Ala Asp Ser Val
    50                  55                  60

Gln Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Lys Asp Arg Phe Gly Thr Gly Thr Asn Phe Asp Tyr Trp Gly Gln
            100                 105                 110

Gly Thr Leu Val Thr Val Ser Ser
            115                 120

<210> SEQ ID NO 55
<211> LENGTH: 120

<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 55

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Asn Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Ser Cys
                85                  90                  95

Ala Lys Asp Arg Phe Gly Thr Gly Thr Asn Phe Asp Tyr Trp Gly Gln
            100                 105                 110

Gly Thr Leu Val Thr Val Ser Ser
        115                 120

<210> SEQ ID NO 56
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 56

Glu Val Gln Leu Leu Glu Ser Gly Gly Gly Leu Val Gln Pro Gly Glu
1               5                   10                  15

Ser Leu Arg Leu Ser Cys Ala Ala Ser Gly Phe Thr Phe Ser Ser Tyr
            20                  25                  30

Ala Met Ser Trp Val Arg Trp Ala Pro Gly Thr Gly Leu Glu Trp Val
        35                  40                  45

Ser Thr Val Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Glu Tyr Tyr Cys
                85                  90                  95

Ala Lys Asp Arg Phe Gly Thr Gly Thr Asn Phe Asp Tyr Trp Gly Gln
            100                 105                 110

Gly Thr Leu Val Thr Val Ser Ser
        115                 120

<210> SEQ ID NO 57
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

```
<400> SEQUENCE: 57

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Asn Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Arg Thr Tyr Tyr Ala Asp Ser Val
    50                  55                  60

Lys Gly Arg Phe Thr Ile Ser Arg Asp Asn Ser Lys Asn Thr Leu Ser
65                  70                  75                  80

Leu Gln Met Asn Ser Leu Arg Ala Glu Asp Thr Ala Val Tyr Ser Cys
                85                  90                  95

Ala Lys Asp Arg Phe Gly Thr Gly Thr Asn Phe Asp Tyr Trp Gly Gln
            100                 105                 110

Gly Thr Leu Val Thr Val Ser Ser
            115                 120

<210> SEQ ID NO 58
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 58

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Leu Ala Pro Gly Lys Gly Leu Glu Trp Val
        35                  40                  45

Ser Thr Val Ser Gly Thr Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Ser Cys
                85                  90                  95

Ala Lys Asp Arg Phe Gly Ser Gly Thr Asn Phe Asp Tyr Trp Gly Gln
            100                 105                 110

Gly Thr Leu Val Thr Val Ser Ser
            115                 120
```